(12) United States Patent
Ciuperca

(10) Patent No.: US 12,000,161 B2
(45) Date of Patent: *Jun. 4, 2024

(54) SELF-ANNEALING CONCRETE, SELF-ANNEALING CONCRETE FORMS, AND TEMPERATURE MONITORING SYSTEM FOR SELF-ANNEALING CONCRETE FORMS

(71) Applicant: Romeo Ilarian Ciuperca, Atlanta, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,317

(22) Filed: Dec. 23, 2022

(65) Prior Publication Data

US 2023/0128237 A1 Apr. 27, 2023

Related U.S. Application Data

(63) Continuation of application No. 16/404,718, filed on May 6, 2019, now Pat. No. 11,536,040, which is a
(Continued)

(51) Int. Cl.
*E04G 11/08* (2006.01)
*C04B 28/04* (2006.01)
(Continued)

(52) U.S. Cl.
CPC ............. *E04G 11/08* (2013.01); *C04B 28/04* (2013.01); *C04B 28/08* (2013.01); *C04B 40/04* (2013.01);
(Continued)

(58) Field of Classification Search
CPC .......... E04G 9/10; E04G 11/06; E04G 11/08; E04G 11/18; E04G 17/02; E04G 17/04;
(Continued)

(56) References Cited

U.S. PATENT DOCUMENTS

| 8,532,815 | B1 * | 9/2013 | Ciuperca | H05B 1/0227 |
| | | | | 702/81 |
| 2014/0263942 | A1 * | 9/2014 | Ciuperca | E04G 17/14 |
| | | | | 249/191 |
| 2018/0126589 | A1 * | 5/2018 | Ciuperca | B28B 17/0081 |

FOREIGN PATENT DOCUMENTS

| CA | 2906018 A1 * | 9/2014 | ............. B28B 7/346 |
| DE | 102019219918 A1 * | 6/2021 | ......... B28B 17/0081 |

(Continued)

*Primary Examiner* — Brent W Herring
(74) *Attorney, Agent, or Firm* — Robert E. Richards

(57) ABSTRACT

The invention comprises a product. The product comprises a first removable concrete form having a concrete forming face and a first insulating panel insert having a first primary surface and an opposite second primary surface, wherein the second primary surface of the first insulating panel insert contacts the concrete forming face of the first removable concrete form. The product also comprises an elongate anchor member having an enlarged portion and an elongate portion, the elongate portion having a first end and an opposite second end, wherein the enlarged portion is disposed adjacent the first end and contacts the second primary surface of the first insulating panel insert and wherein the elongate portion extends through the first insulating panel insert and extends outwardly from the first primary surface of the first insulating panel insert. A method of using a removable insulated concrete form system is also disclosed.

9 Claims, 15 Drawing Sheets

Related U.S. Application Data continuation of application No. 15/418,937, filed on Jan. 30, 2017, now Pat. No. 10,280,622.

(60) Provisional application No. 62/289,263, filed on Jan. 31, 2016.

(51) Int. Cl.

| | |
|---|---|
| *C04B 28/08* | (2006.01) |
| *C04B 40/04* | (2006.01) |
| *E04B 1/16* | (2006.01) |
| *E04B 5/36* | (2006.01) |
| *E04C 5/16* | (2006.01) |
| *E04G 9/06* | (2006.01) |
| *E04G 9/10* | (2006.01) |
| *E04G 11/38* | (2006.01) |
| *E04G 17/06* | (2006.01) |
| *E04G 17/065* | (2006.01) |
| *E04G 17/14* | (2006.01) |
| *E04G 21/06* | (2006.01) |
| *E04B 2/86* | (2006.01) |
| *E04B 5/48* | (2006.01) |
| *E04G 9/02* | (2006.01) |

(52) U.S. Cl.
CPC ............. *E04B 1/161* (2013.01); *E04B 5/36* (2013.01); *E04C 5/168* (2013.01); *E04G 9/06* (2013.01); *E04G 9/10* (2013.01); *E04G 11/38* (2013.01); *E04G 17/06* (2013.01); *E04G 17/0658* (2013.01); *E04G 17/14* (2013.01); *E04G 21/06* (2013.01); *E04B 2/8647* (2013.01); *E04B 2002/8682* (2013.01); *E04B 2002/8688* (2013.01); *E04B 5/48* (2013.01); *E04G 2009/028* (2013.01); *E04G 17/0652* (2013.01)

(58) Field of Classification Search
CPC ... E04G 17/06; E04G 17/065; E04G 17/0652; E04G 17/14; C04B 40/04
See application file for complete search history.

(56) References Cited

FOREIGN PATENT DOCUMENTS

| | | | | | |
|---|---|---|---|---|---|
| EP | 3663484 | A1 | * | 6/2020 | ............. E04G 11/08 |
| KR | 20120017229 | A | * | 2/2012 | ............... E04G 9/10 |
| NL | 8700682 | A | * | 10/1988 | ............. E04G 21/02 |
| WO | WO-2013021951 | A1 | * | 2/2013 | ......... B28B 17/0063 |

\* cited by examiner

SELF-ANNEALING CONCRETE, SELF-ANNEALING CONCRETE FORMS, AND TEMPERATURE MONITORING SYSTEM FOR SELF-ANNEALING CONCRETE FORMS

CROSS-REFERENCE TO RELATED APPLICATIONS

This application is a continuation of application Ser. No. 16/404,718 filed May 6, 2019, now U.S. Pat. No. 11,536, 040, which is a continuation of application Ser. No. 15/418, 937, filed Jan. 30, 2017, now U.S. Pat. No. 10,280,622, which claims the benefit of application Ser. No. 62/289,263 filed Jan. 31, 2016.

FIELD OF THE INVENTION

The present invention generally relates to insulated concrete forms. More particularly, the invention relates to a removable concrete form with a removable insulated panel liner. The present invention also relates to an insulated concrete form that is easier to assemble and easier to use. The present invention relates to a removable insulated compound concrete form in which the form can be removed leaving the insulation attached to the concrete. The present invention also relates to a removable insulated compound concrete form wherein the insulation can be removed after the concrete is at least partially cured. The present invention also relates to a removable insulated compound concrete form that results in stronger concrete cured therein. The present invention also relates to temperature and maturity sensors to monitor the concrete temperature, plot a curing and temperature profile in one or more concrete locations, create a temperature map profile to determine the optimum time to remove the insulated panel liner. The present invention further relates to a system of retaining and monitoring the heat of hydration in a structure composed of multiple elements that can predict the in situ concrete maturity and curing. The present invention also relates to methods of using the removable insulated compound concrete form and temperature monitoring system of the present invention.

BACKGROUND OF THE INVENTION

Concrete walls, and other concrete structures, traditionally have been made by building a form. The forms are usually made from plywood, wood, metal and other structural members. Unhardened (i.e., plastic) concrete is poured into the space defined by opposed spaced form members. Once the concrete hardens sufficiently, although not completely, the forms are removed leaving a concrete wall, or other concrete structure or structural member in place.

Conventional removable concrete forms typically use aluminum or some type of plywood reinforced by a metal framing system. Opposed form members are held together by a plurality of metal ties that provide the form with the desired pressure rating. Conventional forms are designed to be strong, safe and durable to meet the challenges of any type of construction, residential or commercial, low-rise or high-rise, walls, columns, piers or elevated slabs.

Conventional removable concrete forms are designed to be removed once the concrete has achieved a desired strength. However, conventional removable concrete forms do not provide insulation to the concrete wall, either during concrete curing or after removal. Consequently, as the concrete is setting and the hydration process is beginning the concrete internal temperature rises to a first peak temperature while at the same time heat is continuously lost to the environment through the un-insulated concrete form panels. Then, generally overnight, as the ambient temperature drops, the concrete cools at a very rapid pace. This rapid cooling creates temperature shock and leads to thermal shrinkage that causes what the industry refers to as concrete temperature shrinkage cracking. After the initial heat loss, as the ambient temperature rises on the following day, the conventional un-insulated concrete forms absorb heat from the environment and the concrete temperature rises to a second peak temperature, which is lower than the first peak temperature, and as the ambient temperature again drops overnight, the concrete heat is once again lost to the environment through the un-insulated concrete form. This process continues from day-to-day following the diurnal temperature swings. Such diurnal temperature fluctuations place thermal stresses on the concrete at a time when the concrete tensile strength is lower than the thermal stresses which allows the initial temperature shrinkage cracking to proliferate. Sulfates, salts and moisture penetrate cracked concrete faster than dense and non-cracked concrete. Through the cracks, moisture and salt prematurely reach steel reinforcement which cause corrosion. Over time, this is a leading cause of concrete failure.

Conventional practice sometimes places insulated blankets over the exterior of the concrete forms to prevent concrete freezing. However, such insulated blankets are relatively thin and are not designed or effective to retain the heat of hydration within the concrete formwork. Also, since concrete forms are usually removed after a relatively short time after concrete placement, insulated blankets are usually removed as well. Although insulated blankets are sometimes used to wrap the concrete after the forms have been removed, such practice is inefficient and doubles cost of installation.

In mass concrete placement using conventional un-insulated concrete forms, while the concrete gains heat at the core, the concrete surface which is in contact with the concrete form loses heat to the surroundings based on the diurnal temperature fluctuations mentioned above further increasing the thermal stresses from the core to the concrete surface. While insulated blankets are sometimes used to wrap mass concrete, the amount of insulation provided by such insulated blankets is relatively low and is only provided to reduce the temperature differential between the surface and the core.

It would therefore be desirable to provide a concrete form that reduces the loss of the heat of hydration to such an extent that thermal shock and stresses are reduced or eliminated and as a result concrete cracking is reduced. By retaining the heat of hydration for longer periods of time, the density of the concrete is increased and the early strength of the concrete is improved. However, for certain applications it may not be desirable to have insulation permanently attached to the concrete. Furthermore, leaving the insulation permanently attached to the concrete is more expensive than using conventional removable concrete forms. Additionally, in order to retain the heat of hydration more economically, it would be desirable to make the insulated concrete form removable and reusable.

It is also desirable to monitor the temperature of the curing concrete in either a removable concrete form, an insulated concrete form or a removable insulated compound concrete form, as disclosed in the present invention. In the prior art, wireless temperature sensors include both a processor/transmitter portion and a temperature sensor portion;

i.e., thermocouple. In the prior art, both the processor/transmitter portion and the temperature sensor portion are embedded in the cured concrete, and, therefore, cannot be reused. This makes monitoring the temperature of curing concrete relatively costly. Therefore, it would be desirable to provide a curing concrete temperature monitoring system that is more economical than prior art systems.

SUMMARY OF THE INVENTION

The present invention satisfies the foregoing needs by providing a removable insulated compound concrete form system.

In accordance with the present invention, to retain sufficient heat of hydration within the formwork, the insulating panel must provide sufficient insulating properties and should be placed on the concrete surface within the formwork. When an insulated panel liner is used in conjunction with a conventional removable concrete form, the heat of hydration is blocked on the concrete surface thereby eliminating the initial thermal shock and retaining an effective amount of heat of hydration within the formwork to improve the physical properties of the concrete. With the present invention the conventional removable concrete form can be removed at the usual point in time, leaving behind the insulating panel inserts attached to concrete until such time that the concrete has achieved the desired temperature curing profile, strength and physical properties. By placing insulating panel inserts into the conventional removable concrete forms in accordance with the present invention, temperature fluctuations from the concrete surface are significantly reduced or eliminated, the temperature differential is stabilized, thermal shock and internal stresses are greatly reduced or eliminated, reducing cracking and creating a denser, more durable concrete structure.

In one disclosed embodiment, the present invention comprises a product. The product comprises a first removable concrete form having a concrete forming face and a first foam insulating panel insert having a first primary surface and an opposite second primary surface, wherein the second primary surface of the first foam insulating panel insert contacts the concrete forming face of the first removable concrete form.

In another disclosed embodiment, the present invention comprises a product. The product comprises a first removable concrete form having a concrete forming face and a first foam insulating panel insert having a first primary surface and an opposite second primary surface, wherein the second primary surface of the first foam insulating panel insert contacts the concrete forming face of the first removable concrete form. The product also comprises an elongate anchor member having an enlarged portion and an elongate portion, the elongate portion having a first end and an opposite second end, wherein the enlarged portion is disposed adjacent the first end and contacts the second primary surface of the first foam insulating panel insert and wherein the elongate portion extends through the first foam insulating panel insert and extends outwardly from the first primary surface of the first foam insulating panel insert.

In another disclosed embodiment, the present invention comprises a product. The product comprises a first removable concrete form having a concrete forming face and a first foam insulating panel insert having a first primary surface and an opposite second primary surface, wherein the second primary surface of the first foam insulating panel insert contacts the concrete forming face of the first removable concrete form. The product also comprises a quantity of concrete contacting the first primary surface of the first foam insulating panel insert and an anchor member removable securing the first foam insulating panel to the quantity of concrete.

In another disclosed embodiment, the present invention comprises a product. The product comprises a concrete forming panel and a quantity of plastic concrete in contact with the concrete forming panel. The product also comprises a concrete temperature sensor disposed in the quantity of plastic concrete and a processor/transmitter disposed outside of the plastic concrete, wherein the first temperature sensor is electrically connected to the first processor/transmitter.

In another disclosed embodiment, the present invention comprises a method. The method comprises placing a first removable concrete form having a concrete forming face, placing a first foam insulating panel insert so that it contacts the concrete forming face of the first removable concrete form and placing a quantity of plastic concrete in contact with the first foam insulating panel insert. The method also comprises allowing the quantity of plastic concrete to partially cure, removing the first removable concrete form; and allowing the quantity of partially cured concrete to further cure in contact with the first foam insulating panel insert.

In another disclosed embodiment, the present invention comprises a method. The method comprises placing a first removable concrete form having a concrete forming face, placing a first foam insulating panel insert so that it contacts the concrete forming face of the first removable concrete form, placing a second removable concrete form having a concrete forming face, wherein the second removable concrete form is spaced from the first removable concrete form and placing a second foam insulating panel insert so that it contacts the concrete forming face of the second removable concrete form, wherein the first and second foam insulating panel inserts are spaced from each other and define a concrete receiving space therebetween.

In another disclosed embodiment, the present invention comprises a method. The method comprises placing a first removable concrete form having a concrete forming face, placing a first foam insulating panel insert so that it contacts the concrete forming face of the first removable concrete form, placing a second removable concrete form having a concrete forming face, wherein the second removable concrete form is spaced from the first removable concrete form and placing a second foam insulating panel insert so that it contacts the concrete forming face of the second removable concrete form, wherein the first and second foam insulating panel inserts are spaced from each other and define a concrete receiving space therebetween. The method also comprises placing a quantity of plastic concrete in the concrete receiving space.

In another disclosed embodiment, the present invention comprises a method. The method comprises placing a first removable concrete form having a concrete forming face, placing a first foam insulating panel insert so that it contacts the concrete forming face of the first removable concrete form, placing a second removable concrete form having a concrete forming face, wherein the second removable concrete form is spaced from the first removable concrete form and placing a second foam insulating panel insert so that it contacts the concrete forming face of the second removable concrete form, wherein the first and second foam insulating panel inserts are spaced from each other and define a concrete receiving space therebetween. The method also comprises placing a quantity of plastic concrete in the concrete receiving space, allowing the quantity of plastic concrete to partially cure, removing the removable concrete forms and allowing the quantity of partially cured concrete to further cure disposed between the first and second foam insulating panel inserts.

In another disclosed embodiment, the present invention comprises a method. The method comprises placing a first removable concrete form having a concrete forming face, placing a first foam insulating panel insert so that it contacts the concrete forming face of the first removable concrete form. The method also comprises placing a concrete temperature sensor spaced from the first foam insulating panel insert and placing a processor/transmitter between the first foam insulating panel insert and the first removable concrete form, wherein the first temperature sensor is electrically connected to the first processor/transmitter. The method also comprises placing a quantity of plastic concrete in contact with the first foam insulating panel insert such that the first concrete temperature sensor is disposed in the quantity of plastic concrete, allowing the quantity of plastic concrete to partially cure, removing the removable concrete forms and allowing the quantity of partially cured concrete to further cure disposed between the first and second foam insulating panel inserts. The method further comprises monitoring the temperature of the quantity of plastic concrete as it cures.

Accordingly, it is an object of the present invention to provide an improved concrete forming system.

Another object of the present invention is to provide a removable insulated compound concrete form system.

Another object of the present invention is to provide a removable insulated compound concrete form system that retains the heat of hydration of curing concrete.

Another object of the present invention is to provide a removable insulated compound concrete form system that reduces or eliminated initial thermal shock.

Another object of the present invention is to provide a concrete structure that includes integrally attached insulation on one or both sides.

Another object of the present invention is to provide a removable insulated compound concrete form system that is relatively easy to manufacture and/or to assemble.

Still another object of the present invention is to provide a removable insulated compound concrete form system that can be reused many times.

Another object of the present invention is to provide a removable insulated compound concrete form system that provides improved temperature stability for the curing of concrete.

A further object of the present invention is to provide a removable insulated compound concrete form system that permits the placement of concrete during cold weather, which thereby allows construction projects to proceed rather than be shutdown due to inclement weather.

A further object of the present invention is to provide an insulated concrete form system that can withstand pressures equivalent to conventional removable concrete form systems.

Yet another object of the present invention is to provide a removable insulated compound concrete form system that is more economical than prior art insulated concrete form system.

Another object of the present invention is to provide a removable insulated compound concrete form system that retains the heat generated by the hydration of cement during the early stages of concrete setting and curing.

Another object of the present invention is to provide a removable insulated compound concrete form system wherein a removable concrete form is removed after an initial phase of concrete setting and curing while an insulated form remains for a second phase of concrete curing.

Another object of the present invention is to provide a removable insulated compound concrete form system wherein both the removable concrete form and the insulated concrete form can be removed from concrete at least partially cured therein.

Still another object of the present invention is to provide an insulated concrete form system that provides an improved curing environment for concrete.

Another object of the present invention is to provide a removable insulated compound concrete form and concrete temperature monitoring system, which permits the monitoring of concrete temperature before and after removal of the removable concrete form.

Another object of the present invention is to provide a removable insulated compound concrete form and concrete temperature monitoring system, which permits the monitoring of concrete temperature to determine a desirable temperature curing profile and insulating panel insert removal.

These and other objects, features and advantages of the present invention will become apparent after a review of the following detailed description of the disclosed embodiments and the appended drawing and claims.

DETAILED DESCRIPTION OF THE DISCLOSED EMBODIMENTS

U.S. Pat. Nos. 8,545,749; 8,636,941 and 9,458,637 and are all incorporated herein by reference in their entirety.

Figure 1:
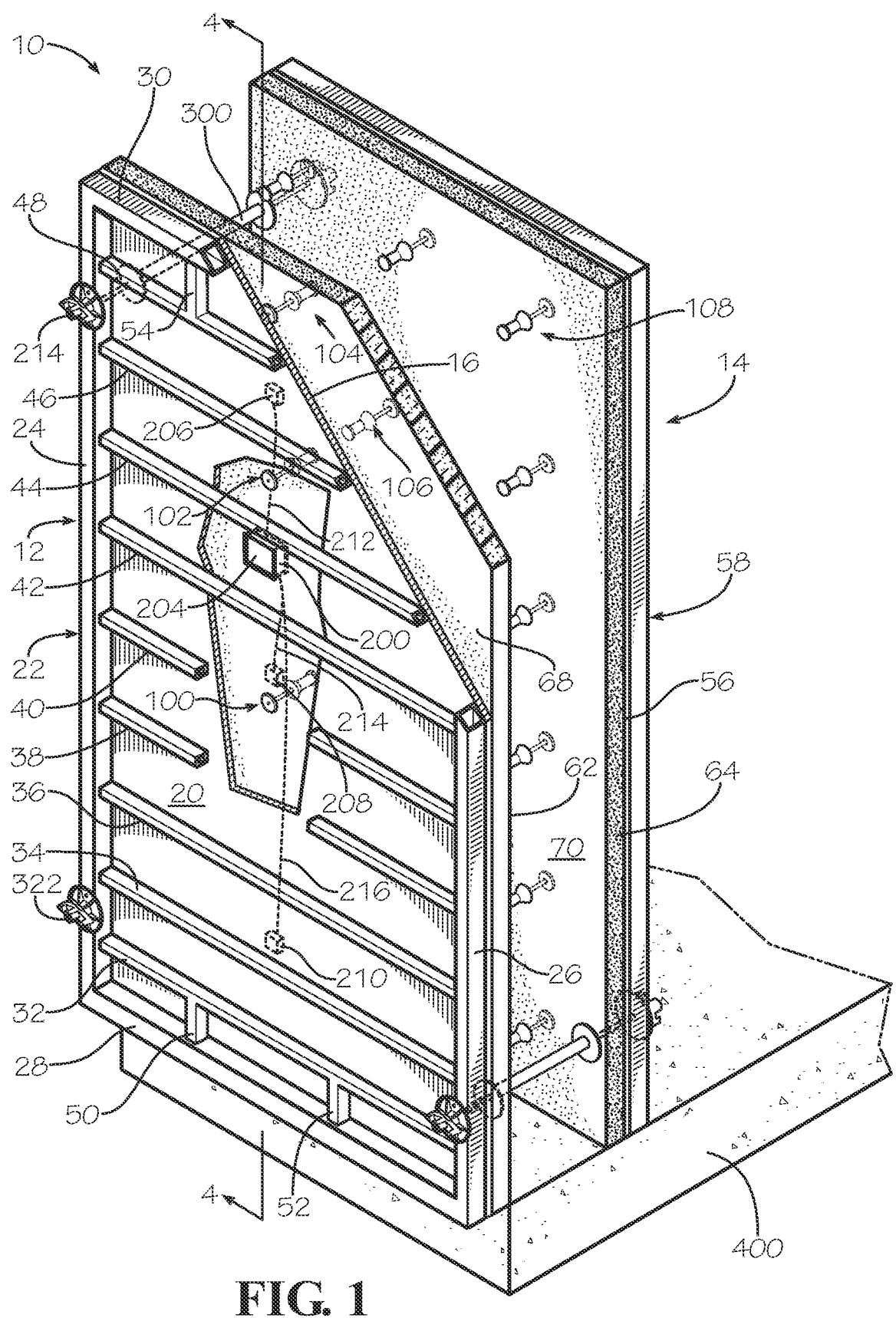
FIG. 1 is a perspective view of a disclosed embodiment of a removable insulated compound concrete form in accordance with the present invention.

Referring now to the drawing in which like numbers indicate like elements throughout the several views, there is shown in FIG. 1 a disclosed embodiment of a removable insulated compound concrete form 10 in accordance with the present invention. The removable insulated compound concrete form 10 includes a first conventional removable concrete form 12 and a second conventional removable concrete form 14 vertically oriented and horizontally spaced from the first conventional removable concrete form. The first and second removable concrete forms 12, 14 are identical, so only the first removable concrete form will be described in detail. The removable concrete form 12 comprises a rectangular concrete forming first face panel 16 made of a strong material, such as wood or metal. Most prior art removable concrete forms have concrete forming face panels made from wood, plywood, wood composite materials, or wood or composite materials with polymer coatings for the concrete forming panel of their removable concrete forms. A preferred prior art material for the first face panel 16 is a sheet of high density overlay (HDO) plywood. When the first face panel 16 is made from a wood-based product, the first face panel can be any useful thickness depending on the anticipated load the form will be subjected to. However, thicknesses of 0.5 inches to ⅞ inches are typically used. When the first face panel 16 is made from metal, it is typically made from aluminum or steel. The thickness or the type of material of the first face panel 16 is not critical to the present invention. The first face panel 16 has a first primary surface 18 for contacting plastic concrete and an opposite second primary surface 20. The first primary surface 18 is usually smooth and flat. The first primary surface 18 can also include a polymer coating or polymer laminate to make the surface smoother and more durable and for providing enhanced concrete release properties.

Attached to the second primary surface 20 of the first face panel 16 is a first rectangular frame 22, which comprises two elongate longitudinal members 24, 26 and two elongate transverse members 28, 30. The longitudinal members 24, 26 and the elongate transverse members 28, 30 are attached to each other and to the face panel 12 by any suitable means used in the prior art. The frame 22 also comprises at least one, and preferably a plurality, of transverse bracing members 32, 34, 36, 38, 40, 42, 44, 46, 48. The transverse bracing members 32-48 are attached to the longitudinal members 24, 26 and to the panel 16 by any suitable means used in the prior art. The frame 22 also includes bracing members 50, 52 and 54 (and a fourth bracing member not shown). The bracing members 50, 52 extend between the transverse member 28 and the bracing member 32. The bracing members 50, 52 are attached to the transverse member 28 and the bracing member 32 and to the panel 16 by any suitable means used in the prior art. The bracing members 54 (and a fourth bracing member not shown) extend between the transverse member 30 and the bracing member 48. The bracing members 54 (and a fourth bracing member not shown) are attached to the transverse member 30 and the bracing member 48 and to the panel 16 by any suitable means used in the prior art. The frame 22 helps prevent the panel 16 from flexing or deforming under the hydrostatic pressure of plastic concrete when place between opposed forms 12, 14. The frame 22 can be made from any suitable material, such as wood or metal, such as aluminum or steel, depending on the load to which the form will be subjected. The particular design of the frame 22 is not critical to the present invention. There are many different designs of frames for removable concrete forms and they are all applicable to the present invention. For example, removable concrete forms suitable for use in the present invention are commercially available under the designation Frami Xlife, Framax Xlife, Top 50, H20 and KS Xlife from Doka USA Ltd., Little Ferry, NJ 07643; from Wall-Tie & Forms, Inc., Shawnee, KS 66226; from EFCO Corp., Des Maines, IA 50313; from Western Forms, Kansas City, MO 64120; LECO Concrete Forms & Supply, Cumming, GA 30041; Perry Concrete Forming Supply, Pembroke, MA 02359; Ellis Formwork Manufacturing, LLC, Oklahoma City, OK 73114; under the designation Symons®, Max-A-Form® and Flex-Form® from Dayton Superior Corporation, Miamisburgh, OH 45342; from MEVA Formwork Systems, Inc., Springfield, OH 45502 and from Formtech Concrete Forms, Inc., Wixom, MI 48393.

The second removable concrete form 14 includes a concrete forming second face panel 56 and a second rectangular frame 58. The second face panel 56 has a has a first primary surface 58 for contacting plastic concrete and an opposite second primary surface 60. As stated above, the second removable concrete form 14 is can be identical to the first removable concrete form 22 or it can be any other configuration as deemed necessary by actual field conditions. However, depending on the needs of a particular construction project, the first and second removable concrete forms 12, 14 may be different, but generally will always include the elements of a concrete forming face panel and a reinforcing frame. The face panel reinforcement can also constitute a plurality of horizontal whalers and/or vertical strong backs to which plywood is then nailed to form the removable concrete form, such as the Hi-Lite Aluminum Concrete Shoring System available from Hi-Lite Systems Inc., Mississauga, Ontario, Canada.

Disposed adjacent the first removable concrete form 12 is a first insulating panel insert 62. The first insulating panel insert is disposed between the first and second removable concrete forms 12, 14. Disposed adjacent the second removable concrete form 14 is a second insulating panel insert 64. The first insulating panel insert 62 is disposed between the first and second removable concrete forms 12, 14. In the disclosed embodiment, the first insulating panel insert 62 substantially covers, and preferably completely covers, the first face panel 16. Similarly, the second insulating panel insert 64 substantially covers, and preferably completely covers, the second face panel 56. Preferably, the first insulating panel insert 62 contacts the first primary surface 18 of the first face panel 16 and the second insulating panel insert 64 contacts the first primary surface 58 of the second face panel 56. However, for certain applications, it may be desirable to include one or more layers of material between the first insulating panel insert 62 and the first face panel 16 and between the second insulating panel insert 64 and the second face panel 56. What is important is that the insulating panel be as close as possible to the concrete forming face panel of the removable concrete form, so that the hydrostatic pressure of concrete placed in the form 10 will not cause the first and second insulating panel inserts 62, 64 to substantially move, but substantially maintain the same distance from the first and second insulating panel inserts to the first and second removable concrete forms 12, 14, respectively, after concrete placement. As used herein, the term "substantially covers" means that more than 80%, and preferably more than 90%, of the primary surface area is covered. As used herein, the term "substantially maintains the same distance" means maintaining more than 90%, preferably more than 95%, and more preferably more than 98%, of the original distance after concrete placement.

The first insulating panel insert 62 has a first primary surface 66 and an opposite second primary surface 68. The second insulating panel insert 64 has a first primary surface 70 and an opposite second primary surface 72.

The first and second insulating panel inserts 62, 64 are made for a thermal insulating material, preferably a polymeric foam, especially a closed cell polymeric foam. The first and second insulating panel inserts 62, 64 can be made from materials that insulate against conductive heat loss and/or radiant heat loss. For example, the first and second insulating panel inserts 62, 64 preferably are made from closed cell insulating foam, including, but not limited to, polyvinyl chloride, urethane, polyurethane, polyisocyanurate, phenol, polyethylene, polyimide or polystyrene. Such insulating foam preferably has a density of 1 to 5 pounds per cubic foot, or more.

The first and second insulating panel inserts 62, 64 preferably each have insulating properties equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam. There is no maximum thickness for the equivalent expanded polystyrene foam useful in the present invention. The maximum thickness is usually dictated by economics, ease of handling and building or structure design. However, for most applications a maximum insulating equivalence of 8 inches of expanded polystyrene foam can be used. In another embodiment of the present invention, the first and second insulating panel inserts 62, 64 each have insulating properties equivalent to approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties include all of the intermediate values. Thus, the first and second insulating panel inserts 62, 64 used in another disclosed embodiment of the present invention each have insulating properties equivalent to approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 4.5 per inch thickness. Therefore, the first and second insulating panel inserts 16, 56 should each have an R-value of greater than or equal to 4, more preferably greater than or equal to 8, especially greater than or equal to 12, most especially greater than or equal to 20. The first and second insulating panel inserts 16, 56 preferably each have an R-value of approximately 4 to approximately 40; especially approximately 8 to approximately 40; more especially approximately 12 to approximately 40. The first and second insulating panel inserts 62, 64 preferably each have an R-value of approximately 4, most preferably approximately 8, especially approximately 20, more especially approximately 30, most especially approximately 40.

In an alternate disclosed embodiment, the first and second insulating panel inserts 62, 64 can be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, NY, USA and RSI4-Blank and RSI8-Blank from Refractory Specialties Incorporated, Sebring, OH, USA. Refractory insulation is commercially available in board form as Duraboard® from Unifrax I LLC, Niagara Falls, NY, USA and CS85, Marinite and Transite boards from BNZ Materials Inc., Littleton, CO, USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer or a polymeric foam, such as polyurethane, latex, cement or epoxy, and used as the first and second insulating panel inserts 62, 64. Such a refractory insulating material can be used as the first and second insulating panel inserts 62, 64 to block excessive ambient heat loads and retain the heat of hydration within the concrete forms of the present invention. Ceramic fibers in a polymer binder, such as latex, are commercially available as Super Therm®, Epoxotherm and HPC Coating from Superior Products, II, Inc., Weston, FL, USA. Fillers can also be added to the polymer or polymeric foam, such as fly ash, volcanic ash, crushed glass, glass spheres and the like.

The first and second insulating panel inserts 62, 64 are each preferably a multi-layer material with a first layer of refractory insulating material and a second layer of polymeric foam insulating material. The first and second insulating panel inserts 62, 64 more preferably each comprise a layer of refractory insulating felt or board and a layer of expanded polystyrene foam.

Figure 5:
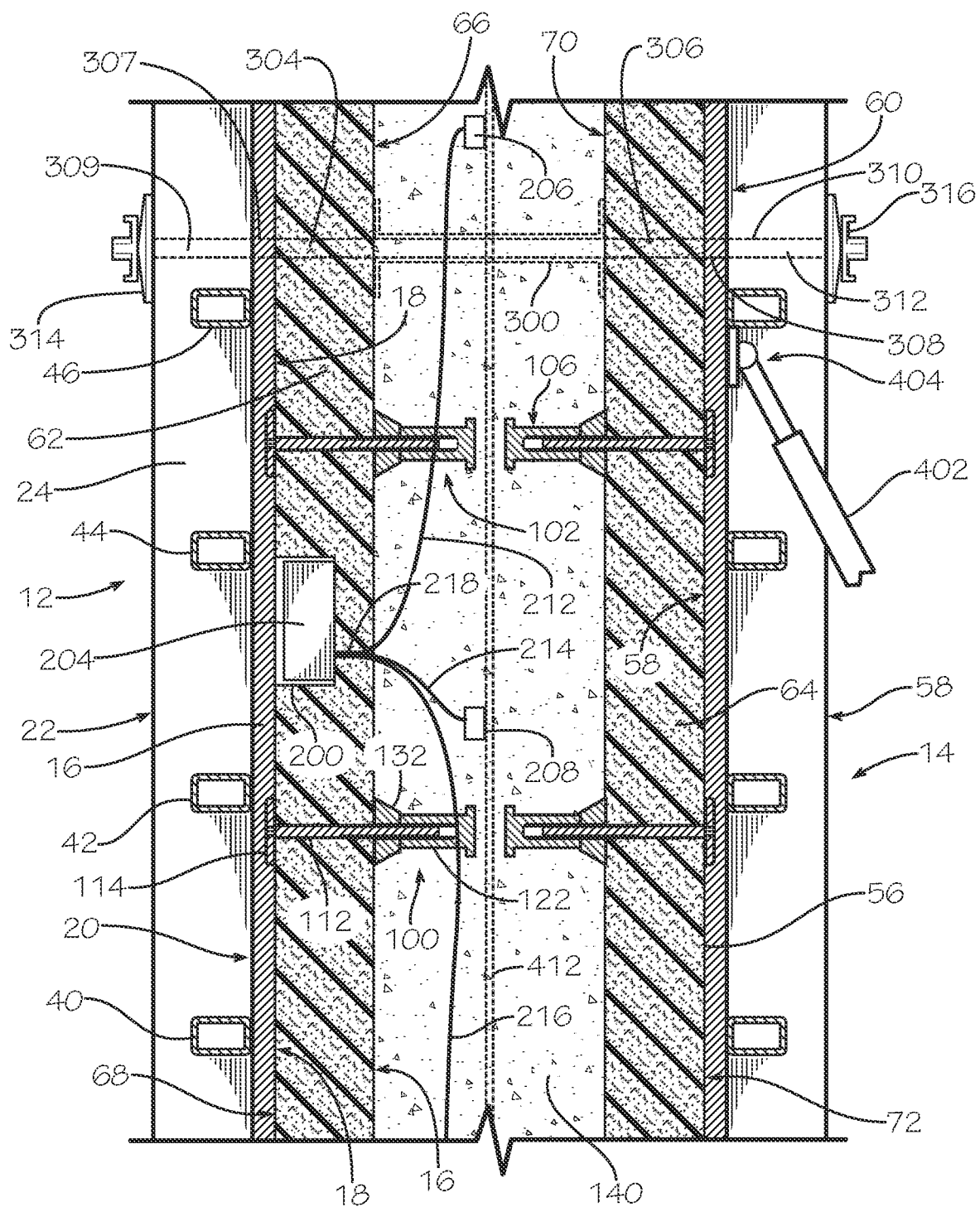
FIG. 5 is a partial detailed cross-sectional view of the removable insulated compound concrete form shown in FIG. 4.

Optionally, the first and second insulating panel inserts 62, 64 include an outer protective layer (not shown); i.e., on one or both of the primary surfaces 66, 68 of the first insulating panel insert 62 and on one or both of the primary surfaces 70, 72 of the second insulating panel insert 64 (FIG. 5). The protective layers (not shown) can be made from a metal sheet, such as steel sheet or aluminum sheet, or from a metal foil, such as steel foil or aluminum foil. In another embodiment, the protective layers (not shown) can be made from a film or sheet of polymeric material, including, but not limited to, polyethylene, polypropylene, polyvinyl chloride, polyvinyl acetate, urethane, polyurethane and the like. It is an important property of the protective layers that they provide durability to the first and second insulating panel inserts 62, 64. It is another important property of the protective layers that they do not significant stick to concrete and/or that concrete release coating can be applied to the protective layers to allow for a quick release of the insulating panels 62, 64 from the cast concrete object or structure.

Figure 2:
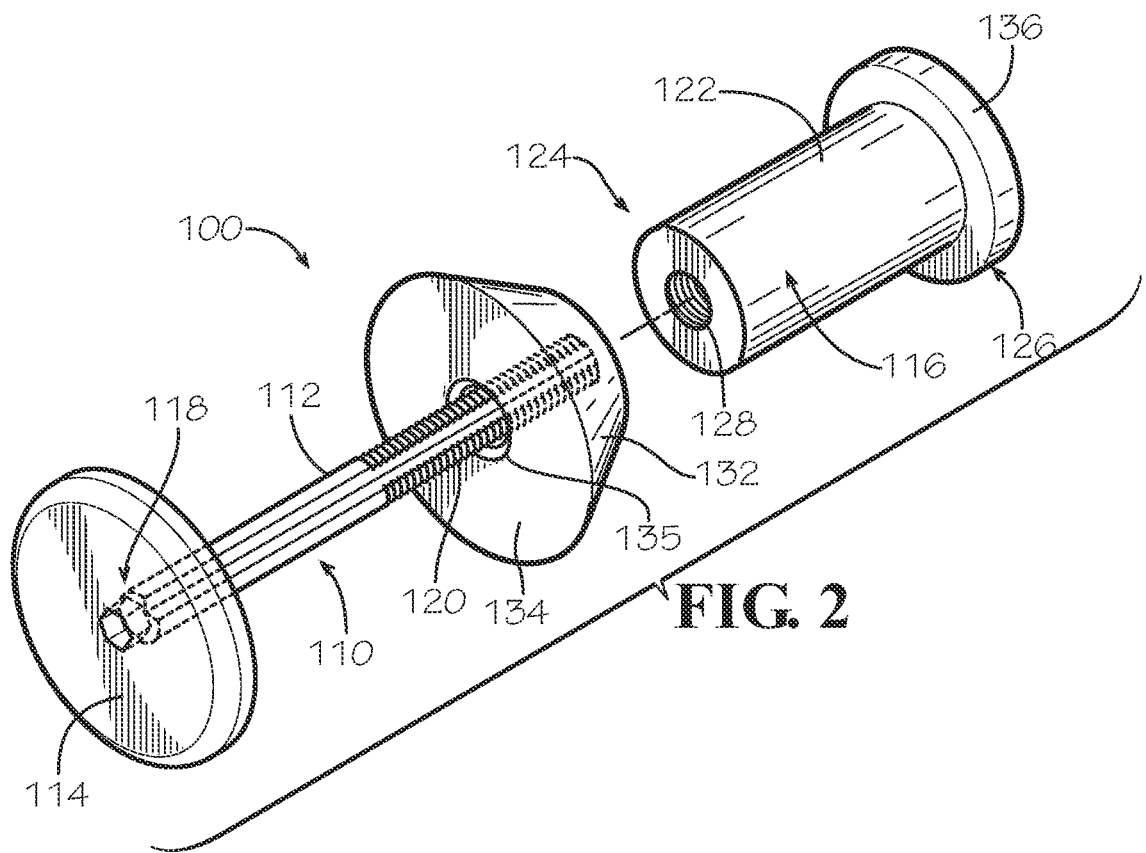
FIG. 2 is an exploded perspective view of an elongate anchor member for use with the removable insulated compound concrete form shown in FIG. 1.
Figure 3:
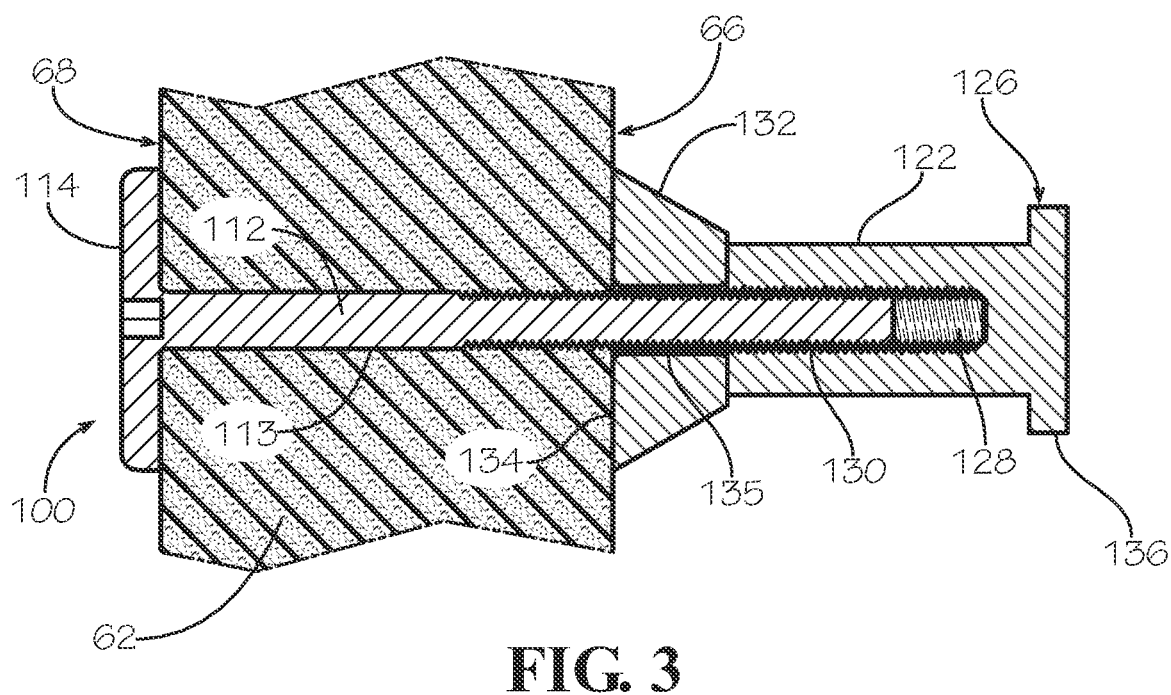
FIG. 3 is a partial cross-sectional detail view taken along the line 3-3 of the removable insulated compound concrete form shown in FIG. 1.

Disposed in each of the first and second insulating panel inserts 62, 64 are a plurality of anchor members, such as the anchor members 100, 102, 104, 106, 108. Each of the anchor members 100, 102, 104, 106, 108 is identical. Therefore, only the anchor member 100 will be described in detail (FIGS. 2 and 3). The anchor member 100 comprises a removable, elongate anchor member 110 having an elongate shaft portion 112 and an enlarged portion (relative to the shaft portion), which is preferably in the form of a relatively thin, flat disk 114, as shown in FIG. 2. Although the enlarged portion of the elongate shaft portion 112 is shown as a round disk 114, it is specifically contemplated that the enlarged portion can be any other suitable geometric shape, such as polygonal. The elongate shaft portion 112 is preferably round or cruciform. The elongate shaft portion 112 has a first end 116 and an opposite second end 118. Formed on the first end 116 of the elongate shaft portion 112 are screw threads 120. The disk member 114 is disposed at the second end 118 of the elongate shaft portion 112 and attached thereto. The elongate anchor member 110 can be made from any suitable material. However, it is specifically contemplated that the elongate anchor member 110 can be reused from one construction project to another. Therefore, the elongate anchor member 110 can be made from a durable plastic, composite material or metal, such as steel or aluminum. It is particularly preferred that the elongate anchor member 110 be made from cast aluminum.

As can be seen from FIG. 3, the elongate shaft portion 112 of the elongate anchor member 110 is inserted through a hole 113 formed in the first insulating panel insert 62 and extends from the second primary surface 68 to the first primary surface 66 and when full inserted so that the disk 114 is flush with the second primary surface, a portion of the elongate shaft portion extends outwardly from the first primary surface. An anchor retaining member 122 has a first end 124 and an opposite second end 126 and defines an internal, longitudinal, hollow shaft 128. The hollow shaft 128 includes screw threads 130 that are formed so as to mate with the screw threads 120 on the elongate shaft portion 112. Therefore, the first end 116 of the elongate shaft portion 112 can be inserted into the hollow shaft 128 of the anchor retaining member 122 and rotated so that the threads 120 mate with the threads 130. Thus, the anchor retaining member 122 can be screwed onto the first end 116 of the elongate shaft portion 112. In one embodiment, the anchor retaining member 122 is screwed onto the elongate shaft portion 112 until the second end 124 of the anchor retaining member contacts the first primary surface 66 of the first insulating panel insert 62. However, preferably in another embodiment shown in FIG. 3, an optional spacer member 132 is positioned on the elongate anchor member 112 between the anchor retaining member 122 and the first primary surface 66. The spacer member 132 preferably has the shape of a truncated cone thereby having a wider base portion 134. The spacer member 132 also defines an internal, longitudinal, hollow shaft 135 sized and shaped to accept the elongate shaft portion 112. Thus, in a preferred embodiment, the spacer member 132 is first positioned on the elongate shaft portion 112 so that the wider base portion 134 of the spacer member contacts the first primary surface 66 of the first insulating panel insert 62. Then, the anchor retaining member 122 is screwed onto the first end 116 of the elongate shaft portion 112 so that the spacer member 132 is tightly captured between the anchor retaining member and the first primary surface of the first insulating panel insert 62. While the present embodiment shows screw threads for attaching the elongate shaft portion 112 to the anchor retaining member 122, it is specifically contemplated that other attachment means can also be used and there is nothing critical about the use of screw threads. For example, the elongate shaft portion 112 can be attached to the anchor retaining member 122 by a cam twist locking mechanism or any other locking mechanism know in the art.

It will be noted that the second end 126 of the anchor retaining member 122 defines an enlarged portion 136 that is greater in diameter than the remaining portion of the anchor retaining member. The purpose of the anchor retaining member 122 is to securely hold the elongate anchor member 110 in the first insulating panel insert 62. Additionally, when concrete 140 placed between the first and second insulating panel inserts 62, 64 hardens, the enlarged portion 136 of the anchor retaining member 122 prevents the anchor retaining member from being pulled out of the hardened concrete. Thus, the first and second insulating panel inserts 62, 64 can be securely attached to the hardened concrete 140 by the plurality of anchor members, such as the anchor members 100-108. While the anchor retaining member 122 shows the enlarged portion 136 at the second end, in another disclosed embodiment the enlarged portion can be located intermediate the ends 124, 126 of the anchor member as long as hardened concrete can capture the enlarged portion behind the first end of anchor member.

A particularly advantageous feature of the present invention is the first and second insulating panel inserts 62, 64 can be removed from the concrete 140 by unscrewing the elongate shaft portion 112 from the anchor retaining member 122 by rotating the disk 114 so that the threads 120 disengage the threads 130. The elongate shaft portion 112 of the elongate anchor member 110 can then be withdrawn from the anchor retaining member 122, from the optional spacer member 132 and from the first insulating panel insert 62. Alternatively, the elongate anchor member 110 can be left in place to permanently secure the first and second insulating panel inserts 62, 64 to the concrete 140. In another disclosed embodiment, the first insulating panel insert 62 can be permanently left in place and the second insulating panel insert 64 can be removed. Conversely, the first insulating panel insert 62 can be removed and the second insulating panel insert 64 can be permanently left in place.

Self-Annealing Concrete is the process in which the mixing water and internal heat generated by the cement hydration are retained within the formwork to accelerate the concrete curing process. By capturing and controlling the internal heat of hydration and moisture loss, the Self-Annealing process provides an environment that optimizes the hydration process and interaction with additives improving both short and long-term performance. The Self-Annealing process eliminates thermal shock, accelerates strength gain, reduces shrinkage and thermal stresses resulting in a more durable concrete.

Retaining and utilizing the heat generated by the hydration reaction results in an autocatalytic reaction where the temperature is elevated until most cement particles are hydrated. The cement hydration rate is increased to more fully hydrate the cement particles at an early stage. This accelerates strength gain and maturity while maintaining moisture content, then gradually allows the concrete to cool to ambient temperature or to a point where the concrete strength can better withstand thermal stresses prior to exposure to the fluctuating temperature of its environment. The autocatalytic reaction produces calcium hydroxide more rapidly and makes it available for reaction with SCMs (supplementary cementitious materials) at an early stage. Higher temperatures increase the SCMs reaction rate. Moisture retention and more uniform concrete temperature minimizes shrinkage, shrinkage cracking and thermal stresses. Therefore, Self-Annealing Concrete has enhanced physical properties both during and after curing due to more complete hydration, elimination of calcium hydroxide and reduced stresses during the curing process. By using greater amounts of SCMs in concrete, the carbon footprint of the concrete can be reduced by more efficient use of portland cement. Other benefits include, but are not limited to, increased paste density, reduced permeability, improved durability, and potential for reduced carbonation.

The defining feature of the Self-Annealing Concrete formwork is that it retains and captures a relatively large portion of the internal heat of hydration. It is recommended that Self-Annealing Concrete temperature be monitored so that it does not exceed unsafe industry limits. The insulating panels can be left in place for a varying amount of time, as little as two days to one or two weeks or the life of the structure. Tracking the curing concrete temperature provides the data needed to determine and assist in deciding at what point the insulating panels can be stripped depending on the project specifications and filed conditions.

Figure 4:
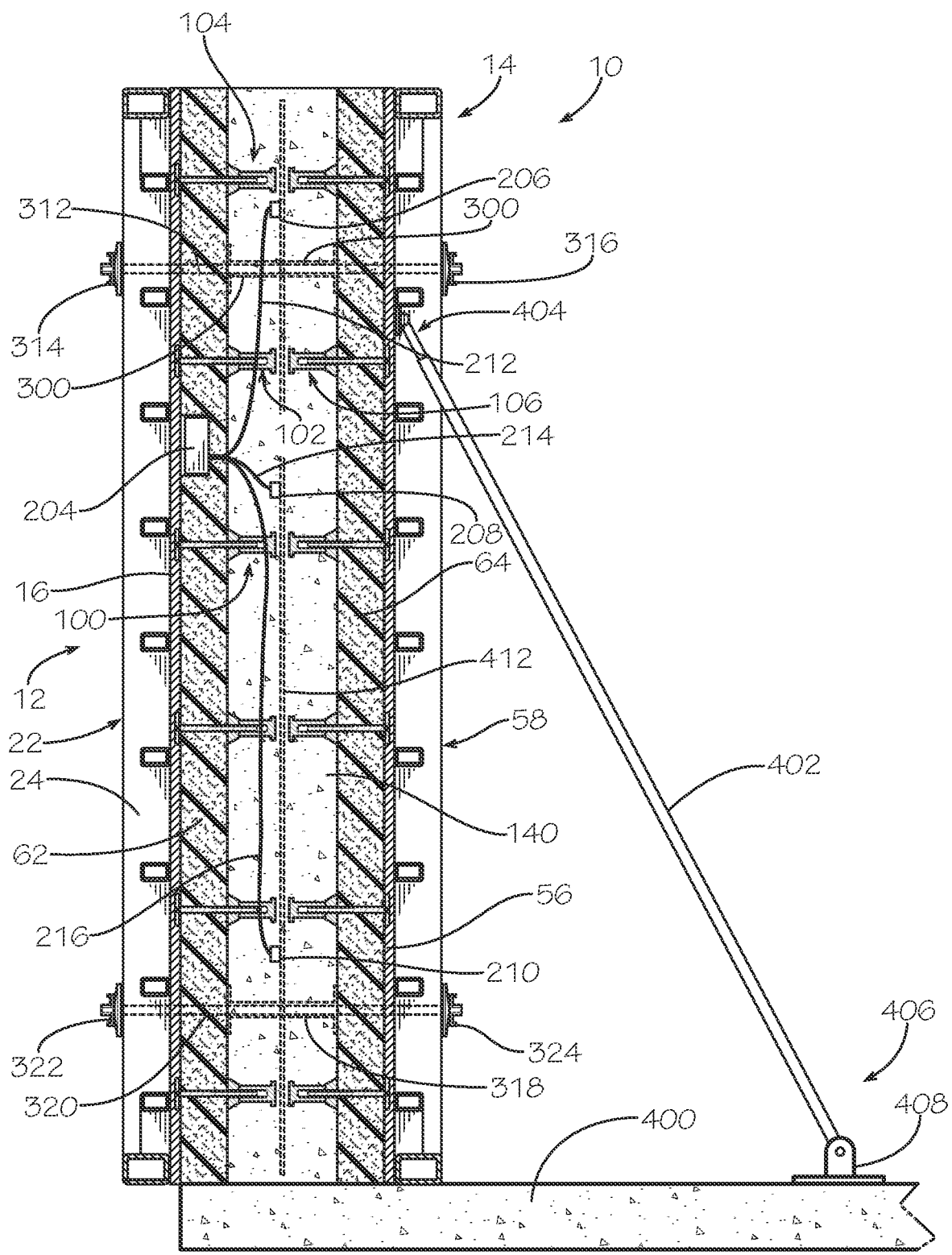
FIG. 4 is a cross-sectional view of the removable insulated compound concrete form shown in FIG. 4-4 shown on a concrete slab.

During the Self-Annealing Concrete curing process, it is an important element of the present invention to monitor the temperature of the concrete in the concrete form during the concrete curing process. Prior art concrete temperature monitoring systems consist of thermocouple sensors embedded in the concrete that have to be connected to external power sources and recording devices, such as computers. These systems pose serious issues since the wires are easily damaged and disconnected from the external source of power and the recording devices. As such they are seldom used in field applications. Other sensors, such Intellirock II™ temperature loggers from Engius, LLC of Stillwater, OK, a subsidiary of Flir, have built in microchips and internal batteries that store the temperature data. Intellirock II™ temperature loggers are placed within the concrete and have a pigtail wire pulled outside the form that allows the data to be manually downloaded to a recording device. Other prior art temperature monitoring systems are wireless. These wireless concrete temperature monitoring systems usually embed both the temperature sensor; i.e., thermocouple, and the processing and transmitting module in the curing concrete so it is not damaged by the formwork or the abusive nature of construction projects. The data is then wirelessly transmitted by the processing/transmitting module through the concrete to a remote receiving/processing module. Although this provided a good temperature monitoring system, it is relatively expensive because the processing/transmitting module cannot be reused since it is embedded in the hardened concrete. In addition, a transmitter embed in concrete has a very short transmission/reception distance. As a result of embedding the transmitter in the concrete, the range can be reduced by as much as 90% compared to the same transmitter outside the formwork. It is specifically contemplated as a part of the present invention to provide a concrete temperature monitoring system in which the processing/transmitting module can be reused. It is also specifically contemplated that the transmitter can placed outside the concrete to increase the range of transmission but still placed within the formwork so that the risk of damage to the transmitting equipment is eliminated. The increased range or transmission is crucial to aggregating the temperature data from multiple elements and multiple transmitters from within the same structure, either in a spread-out horizontal type structure or vertical, multi-floor structure. In order to provide a reusable processing/transmitting module, it is a part of the present invention that the temperature sensor; i.e., thermocouple, is embedded in the curing concrete, but the processing/transmitting module is not embedded in the concrete. Therefore, formed in the first insulating panel insert 62 is a cavity 200 sized and shaped to accommodate a concrete temperature processing/transmitting module 204. The cavity 200 should be as shallow as possible so that the portion 202 of the first insulating panel insert 62 is not substantially weakened. Disposed in the cavity 200 is a wireless concrete temperature processing/transmitting module 204. Wireless concrete temperature processing/transmitting modules and concrete temperature sensors are commercially available under the designation Giatec SmartRock from Giatec Scientific, Inc. Ottawa, Ontario, Canada. The processing/transmitting module 204 however is different from prior art commercially available processing/transmitting modules in several respects. First, since it will be reusable, the processing/transmitting module 204 includes a rechargeable or replaceable battery. But, more importantly, the processing/transmitting module 204 includes multiple inputs for multiple temperature sensors; i.e., thermocouples. Therefore, multiple thermocouples can be positioned at different location in the concrete in the concrete form or in multiple locations in two or more concrete forms or both. For example, as shown in FIGS. 3 and 4, a first thermocouple 206 is disposed in the upper portion of the removable insulated compound concrete form 10, a second thermocouple 208 is disposed in the mid-portion of the concrete form and a third thermocouple 210 is disposed in the lower portion of the concrete form. The first thermocouple 206 is connected to the processing/transmitting module 204 be an electric circuit, such as by wires 212. Similarly, the second thermocouple 208 is connected to the processing/transmitting module 204 be an electric circuit, such as by wires 214 and the third thermocouple 210 is connected to the processing/transmitting module 204 be an electric circuit, such as by wires 216. The wires 212, 214, 216 pass through the first insulating panel insert 62 through a hole 218 formed in the first insulating panel insert, such as by drilling. Although the cavity 200 is shown as being formed in the first insulating panel insert 62, the cavity can alternatively be formed in the second insulating panel insert 64 instead, depending on the requirements of a particular construction project.

It is noted that while the cavity 200 is in the foam panel 62, it is on the opposite surface away from the concrete forming surface 66, 70 of the insulating panels 62, 64 so that the processor/transmitter 204 is outside the concrete receiving cavity 302 which therefore provides an increase transmission range and the ability to reuse processor/transmitter. This location is important that it also protects the transmitter 204 from damage by the fluid concrete during the pour. At the same time, the cavity 200 is covered by the plywood first face panel 16 and therefore protected from the external abuse and potential damage common on a concrete construction site. Of course, the concrete temperature monitoring system of the present invention including the thermocouples 206-210, wires 212-216 and the processor/transmitter 204 optionally can be used in the insulating panel 62 without the use of any anchor members, such as the anchor members 100-108, in the insulating panel.

In order to stabilize the first and second removable concrete forms 12, 14 four connecting rods are used, although other methods known in the prior art for securing the removable concrete forms and gauging the spacing between the removable concrete forms can be used. In this disclosed embodiment, an elongate sleeve 300 (FIG. 5) of exactly the same length as the distance between the inner primary surface 66 of the first insulating panel insert 62 and the inner primary surface 70 of the second insulating panel insert 64 (which is also equal to the thickness of the concrete receiving cavity 302) is disposed between the first and second insulating panel inserts and in axial alignment with holes 304, 306 formed in the first and second insulating panel inserts, respectively, and holes 307, 308 formed in the first and second face panels 16, 56, respectively, and holes 309, 310 formed in the frames 22, 58 of the first and second removable forms 12, 14, respectively, such as through the elongate longitudinal members 24, 26 (FIG. 5). A rod 312 is then inserted through the holes 309, 307, 304, through the sleeve 300 and through the holes 306, 308, 310 so that the opposite ends of the rod extend outwardly from the first and second removable concrete forms 12, 14. The opposite ends of the rod 312 have screw threads (not shown) formed thereon. Collars 314, 316 are then screwed onto the opposite ends of the rod 312 and tightened against the frames 22 of the first removable concrete form 12 and the frame 58 of the second removable concrete form 14, respectively. The sleeve 300 prevents the insulating panels 62, 64 from moving toward each other any further than the desired thickness of the concrete wall to be constructed. Similar rods, sleeves and collars (only portions of which are shown) are positioned at the other three corners of the frames 22, 58 (FIGS. 1 and 4). For example, in the lower left corner of the frame 22 (FIG. 1) are a sleeve 318, a rod 320 and two collars 322, 324 (FIG. 4).

Figure 7:
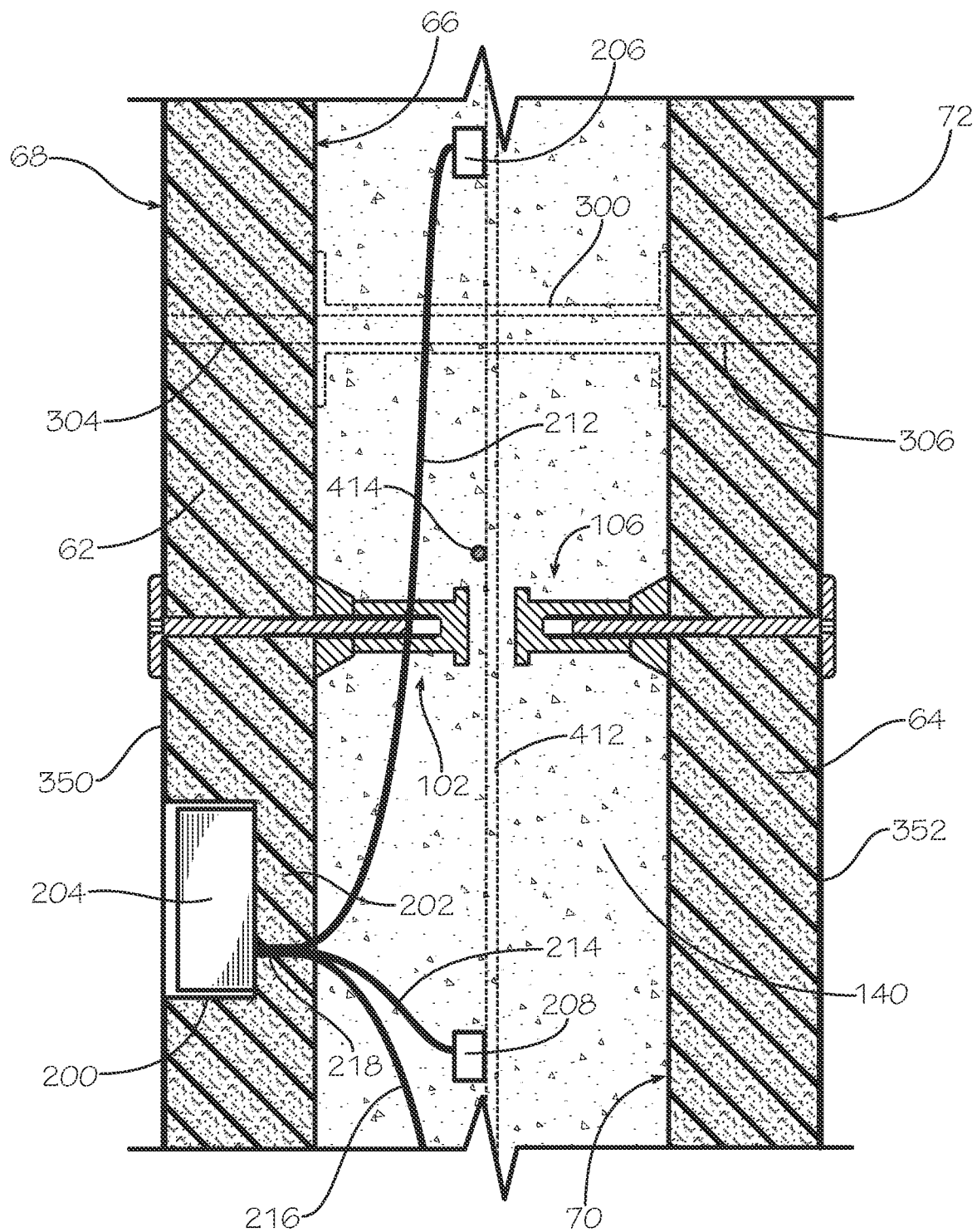
FIG. 7 is a partial detailed cross-sectional side view of the removable insulated compound concrete form shown in FIG. 6.

In another disclosed embodiment, the outer primary surfaces 68, 72 of the first and second insulating panel inserts 62, 64, respectively, can each include a layer of reinforcing material 350, 352 (FIG. 7). The layers of reinforcing material 350, 352 can be made from continuous materials, such as sheets or films, or discontinuous materials, such as fabrics, webs or meshes. The layers of reinforcing material 350, 352 can be made from material such as polymers, for example polyethylene or polypropylene, from fibers, such as fiberglass, basalt fibers, aramid fibers or from composite materials, such as carbon fibers in polymeric materials, or from metal, such as steel or aluminum wires, sheets or corrugated sheets, and foils, such as metal foils, especially aluminum foil. The layers of reinforcing material 350, 352 can be made from metal, but preferably are made from synthetic plastic materials. The plastic materials can be in the form of a sheet or film or in the form of a fabric, web or mesh. A preferred material for the layers of reinforcing material 350, 352 is disclosed in U.S. Pat. No. 7,625,827 (the disclosure of which is incorporated herein by reference in its entirety). Also, the layers of reinforcing material 350, 352 can be made from carbon fiber, alkaline resistant fiberglass, basalt fiber, aramid fibers, polypropylene, polystyrene, vinyl, polyvinyl chloride (PVC), or nylon, or from composite materials, such as carbon fibers in polymeric materials, or the like. For example, the layers of reinforcing material 350, 352 can be made from the mesh or lath disclosed in any of U.S. Pat. Nos. 5,836,715; 6,123,879; 6,263,629; 6,454,889; 6,632,309; 6,898,908 or 7,100,336 (the disclosures of which are all incorporated herein by reference in their entirety). If an extruded foam panel is used, the foam can be extruded between two layers of reinforcing material, such as sheets of metal, such as sheets of aluminum, fibreglass matt, plastic film, plastic sheet and the like.

The layers of reinforcing material 350, 352 can be adhered to the outer surfaces 68, 72 of the insulating panels 62, 64, respectively, by a conventional adhesive that is compatible with the material from which the insulating panels are made. However, it is preferred that the layers of reinforcing material 350, 352 be laminated to the outer surfaces 68, 72 of the insulating panels 62, 64 using a polymeric material that also forms a weather or moisture barrier on the exterior surface of the insulating panels. The weather barrier can be applied to each of the layers of reinforcing material 350, 352 on the surfaces 68, 72 of the insulating panels 62, 64 by any suitable method, such as by spraying, brushing or rolling. The moisture barrier can be applied as the laminating agent for the layers of reinforcing material 350, 352 or it can be applied in addition to an adhesive used to adhere the layers of reinforcing material to the outer surfaces 68, 72 of the insulating panels 62, 64.

The layers of reinforcing material 350, 352 are applied to the insulating panels 62, 64 before the plurality of anchor members, such as the anchor members 100-108 are inserted into the insulating panels. Therefore, at least a portion of the layer of reinforcing material is captured between the outer surface of the insulating panel and the enlarged portion of the elongate anchor member. For example, at least a portion of the layer of reinforcing material 350 is captured between the outer surface 68 of the first insulating panel insert 62 and the enlarged portion or disk member 114 of the elongate anchor member 110. The same is true of the other anchor members, such as the anchor members 102-108.

Use of the removable insulated compound concrete form 10 will now be considered. Initially, the first and second insulating panel inserts 62, 64 are fitted with a plurality of anchor members, such as the anchor members 100-108. A plurality of holes (not shown) are formed in each of the insulating panels 62, 64, such as by drilling. Then, the elongate shaft portion 112 of the elongate anchor member 110 is inserted through the hole in the insulating panel 62 so that the disk member 114 is flush against the second primary surface 68 of the first insulating member 62 and the first end 116 of the elongate shaft portion extends outwardly from the first primary surface 66 of the first insulating member (FIG. 3). Optionally, but preferably, the spacer member 132 is slid onto the first end 116 of the elongate shaft portion 112 until the wider base portion 134 contacts the first primary surface 66 of the first insulating panel insert 62. Then, the anchor retaining member 122 is screwed onto the first end 116 of the elongate shaft portion 112. The anchor retaining member 122 is screwed onto the elongate shaft portion 112 until the spacer member 132 is held tightly against the first primary surface 66 of the first insulating panel insert 62 and the disk member 114 is held tightly against the second primary surface 68 of the first insulating panel insert. This same procedure is followed to secure the other of the plurality of anchor member, such as the anchor members 102-108, in both the first and second insulating panel inserts 62, 64. It should be noted that in FIG. 1 only the anchor retaining members and the spacer members are visible on the first primary surface 70 of the second insulating panel insert 64, such as the anchor retaining member 122' of the anchor member 106.

The second removable concrete form 14 is positioned on a concrete footing or concrete slab 400. The second removable concrete form 14 is plumbed and held in a vertical position by a brace/turnbuckle 402 attached at one end 404 to the second removable concrete form. The other end 406 of the brace/turnbuckle 402 is pivotably attached to a bracket 408 that is anchored to the concrete slab 400, such as by screws or by shooting a nail through the bracket into the concrete slab. Rotation of the brace/turnbuckle 402 lengthens or shortens the brace/turnbuckle, thereby enabling fine adjustment of the second removable concrete form 14 to plumb or true vertical. This procedure is a standard industry practice for setting and securing a removable concrete form and is well known in the art.

Then, the second insulating panel insert 64 is positioned so that the second primary surface 72 of the second insulating panel insert contacts the first primary surface 58 of the second face panel 56 of the second removable concrete form 14. If rebar is necessary or desired, it can be positioned adjacent the second insulating panel insert 64, such as the rebar 412, 414 as shown in FIG. 7. The first, second and third thermocouples 206-210 are optionally positioned at various locations distributed throughout the concrete receiving space 302, as shown in FIG. 4, and conveniently secured in place by attachment to the rebar. The wires 212-216 are then passed through the hole 218 and into the cavity 200. The wires 212-216 are then plugged into separate inputs in the processor/transmitted 204, which is then positioned in the cavity 200. The processor/transmitter 204 provides a separate identification to each of the first, second and third thermocouples 206-210, which are also different from identification provided by other processor/transmitters located in other insulating panel distributed across the worksite. By assigning a unique identification to each thermocouple, the temperature of the curing concrete in multiple portion of the concrete form can be separately monitored and mapped.

The first insulating panel insert 62 is positioned on the slab 400, as shown in FIGS. 1 and 2, spaced from the second insulating panel insert 64 a distance equal to the desired thickness of the vertical concrete wall to be constructed. Then, the first removable concrete form 12 is positioned on the slab 400 adjacent the first insulating panel insert 62 such that the second primary surface 68 of the first insulating panel insert contacts the first primary surface 18 of the first face panel 16 of the first removable concrete form. Holes 309, 307, 304 are formed in the frame 22, the first face panel 16 and the first insulating panel insert 62 in axial alignment with each other. Similarly, holes 310, 308, 306 are formed in the second frame 58 of the second removable concrete form 14 and the second insulating panel insert 64 in axial alignment with each other and with the holes 309, 307, 304. The holes 304-310 can be made by any suitable means, such as by drilling. It should be noted that the holes in the frames of the removable concrete form are typically made during the manufacture of the removable concrete form, and, therefore, may not need to be formed during the installation step described above. The rod 312 is inserted through the holes 309, 307, 304; through the sleeve 300, which is positioned in axial alignment therewith, and through the holes 306, 308, 310 so that the opposite ends of the rod extend outwardly from the frame 22 of the first removable concrete form 12 and from the frame 58 of the second removable concrete form 14. The collars 314, 316 are then screwed onto the opposite ends of the rod 312 and tightened until the sleeve 300 presses firmly against the first and second insulating panel inserts 62, 64. The other sleeves, rods, and collars are positioned at the other three corners of the removable concrete forms 12, 14 in the same manner as described above. The space (FIG. 1) between the opposed first and second insulating panel inserts 62, 64 define a plastic concrete receiving space 302. Of course, additional identical removable concrete forms and insulating panels (not shown) can be placed adjacent the first and second removable concrete forms 12, 14 to provide a wall or other structure of a desired length and/or configuration.

After the removable insulated compound concrete form 10 has been constructed as described above, uncured (i.e., plastic) concrete 140 is placed in the concrete receiving space 302. Because the plastic concrete 140 is insulated on its two primary surfaces by the first and second insulating panel inserts 62, 64, a significant portion of the heat of hydration generated by the hydration process occurring in the plastic concrete is retained within the plastic concrete rather than being quickly lost to the environment as typically happens with conventional non-insulated removable concrete forms. The plastic concrete 140 is allowed to at least partially cure inside the removable insulated compound concrete form 10 at least until the concrete has achieve sufficient strength to be self-supporting, to support whatever loads are applied to it or has achieved a desired predetermined or specified strength. Usually, the plastic concrete will achieve sufficient strength to remove the removable concrete forms 12, 14 within 12 to 72 hours, especially within 24 to 48 hours. For purposes of the present invention, the time for the concrete to go from the initial plastic state to a sufficient strength to be self-supporting, to support whatever loads are applied to it or has achieved a desired predetermined or specified strength shall be designated the "first curing phase." During the first curing phase, the initial temperature drop and thermal shock of the curing concrete are significantly reduced or eliminated.

Figure 6:
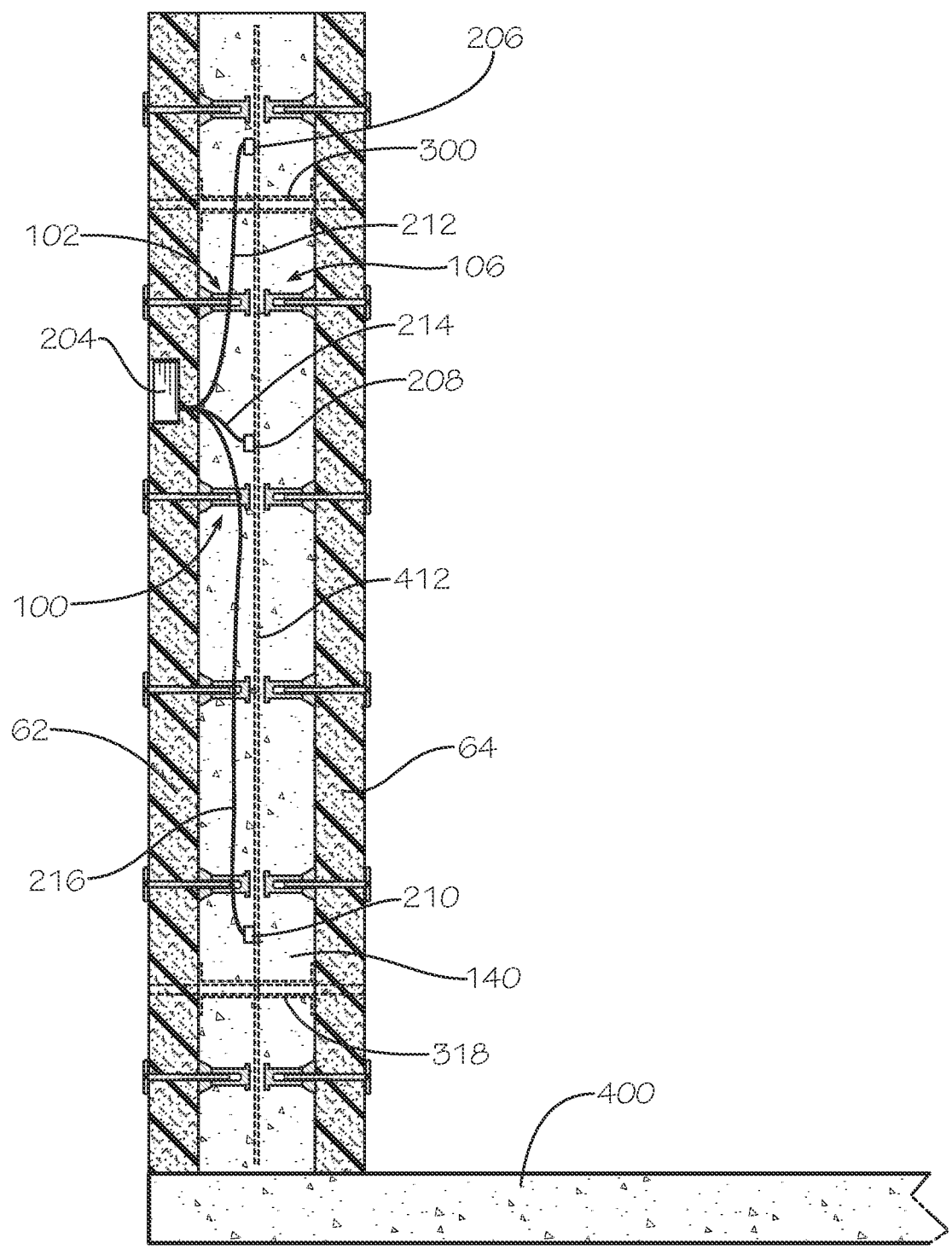
FIG. 6 is a cross-sectional side view of the removable insulated compound concrete form shown in FIG. 4 shown with the removable concrete forms removed.

After the first curing phase of the concrete 140, the removable concrete forms 12, 14 are removed, as shown in FIGS. 6 and 7. The removable concrete forms 12, 14 are removed by first unscrewing the collars 314, 316, 322, 324 from the rods 312, 320 and from the other two rods in the other two corners of the forms. The rods 312, 320 and the other two rods are withdrawn from the removable concrete forms 12, 14 and the brace/turnbuckle 402 is detached from the removable concrete form 14. The removable concrete forms 12, 14 are then separated from the first and second insulating panel inserts 62, 64 and removed from the concrete slab 400. The first and second insulating panel inserts 62, 64 can then be permanently left in place on the concrete 140. Or, the first and second insulating panel inserts 62, 64 can be removed at this point or after a second curing phase. At the end of the first curing phase, the internal temperature of the concrete will be elevated at least 40% above ambient temperature, preferably at least 60% above ambient temperature, more preferably at least 80% above ambient temperature, most preferably at least 100% above ambient temperature, especially at least 120% above ambient temperature, more especially at least 140% above the ambient temperature, most especially at least 160% above the ambient temperature, ideally at least 180% above ambient temperature and more ideally at least 200% over the ambient temperature, but not exceeding an unsafe temperature that would damage the concrete. For purposes of the present invention, the term "second curing phase" shall mean the time required for the concrete 140 to go from the first curing phase to a state where the concrete has achieved at least 60% of its final compression strength, preferably at least 80% of its final compression strength, more preferably at least 90% of its final compression strength, or the temperature of the concrete begun to cool after reaching its maximum temperature down to 120% of ambient temperature, preferably 110% of ambient temperature, especially ambient temperature. During the second curing phase, the first and second insulating panel inserts 62, 64 remain in place on the concrete 140, as shown in FIGS. 6 and 7. The second curing phase can be 1 to 3 days long, preferably 1 to 5 days long, more preferably 1 to 7 days long, especially 1 to 14 days long, more especially 3 to 14 days long, most especially 5 to 14 days long. The foregoing period for the second curing phase includes all of the intermediate values.

Another defining feature of the first and second phase of the concrete curing is that it eliminates the sharp temperature drop during the first 12-36 hours when the heat of hydration is lost to the environment thorough uninsulated, conventional removable concrete forms. At this stage of the concrete curing process, the concrete is in a relatively weak state, such as less than 50% or its ultimate compressive strength. This sharp temperature drop is also called thermal shock and it is a cause of temperature shrinkage cracking associated with conventional concrete forms.

After the second curing phase of the concrete 140, the first and second insulating panel inserts 62, 64 are removed from the concrete. To remove the first and second insulating panel inserts 62, 64, the plurality of elongate anchor members, such as the elongate anchor member 100-108, the disk 114 is rotated counterclockwise so that the end 116 of the elongate shaft portion 112 is unscrewed from the retaining member 122. The elongate anchor member 110 is then removed from the first and second insulating panel inserts 62, 64. Because the concrete 140 has hardened, the enlarge portion 136 of the retaining member 122 prevents the retaining member from being pulled out of the hardened concrete. Thus, the retaining member 122 will permanently remain in the hardened concrete 140. After the plurality of elongate anchor members, such as the elongate anchor members 100-108, have been removed from the first and second insulating panel inserts 62, 64, the first and second insulating panel inserts are separated from the hardened concrete 140. If a spacer member 132 has been used with each of the plurality of elongate anchor members, such as the elongate anchor members 100-108, the spacer members can be removed from the hardened concrete 140 because the spacer member is made from a material that does not stick to concrete and the wider base portion 134 of the spacer member will be flush with the exterior surface of the concrete. After the spacer members, such as the spacer member 132, have been removed from the hardened concrete 140, they can be reused in a subsequent construction project, if desired. Alternatively, the optional spacer members 132 can be permanently left in the hardened concrete. However, if the spacer members 132 are removed from the hardened concrete 140 a cone-shaped depression will be left in the concrete where the spacer member was removed. If desired, such cone-shaped depression can then be filled with a filler material, such as a cementitious concrete patching compound, so as to leave a completely flat exterior surface on the hardened concrete.

If the processor/transmitter 204 has been used with this embodiment, the wires 212, 214, 216 can be disconnected from the processor/transmitter. The processor/transmitter 204 can then be removed from the cavity 200 in the first insulating panel insert 62 so that the processor/transmitter can be reused. Of course the thermocouples 206, 208, 210 and a portion of the wires 212, 214, 216 remain embedded in the hardened concrete 140. The portion of the wires 212, 214, 216 outside the hardened concrete 140 can be cut off at the surface of the hardened concrete.

FIGS. 8-11 is another disclosed embodiment of the present invention. FIGS. 8-11 disclose a removable horizontal insulated compound concrete form 500 for use in constructing an elevated slab or roof structure. Specifically, there is shown the horizontal concrete slab 400 upon which has been built a vertical concrete wall 502 using the removable insulated compound concrete forms 10 described above, such as with respect to FIGS. 1-7. Since the vertical concrete wall 502 has already hardened sufficiently (i.e., achieved at least the first curing phase), the removable concrete forms 12, 14 have been removed, but the first and second insulating panel inserts 62, 64 are still in place. The elevated concrete slab is therefore constructed after the concrete 140 of the vertical concrete wall has achieved at least the first phase of curing.

The removable horizontal insulated compound concrete form 500 for the elevated concrete slab or roof structure is then prepared by first erecting a supporting structure. The supporting structure comprises a plurality of post shores, such as the post shores 504, 506, the bottoms of which sit on the top surface 508 of the concrete slab 400. The top portion of each of the post shores, such as post shores 504, 506, support a plurality of horizontal elongate beams, such as the beam 510. The beams, such as the beam 510, can be of any conventional design well known in the art. The beams, such as the beam 510, extend laterally from the vertical wall 502 to the opposing wall (not shown). The plurality of beams, such as the beam 510, support a plurality of stringers, such as the stringers 512, 514, 516, 518, 520, 522. The stringers, such as the stringers 512-522, can be of any conventional design well known in the art.

Disposed on top of the plurality of stringers, such as the stringers 512-522, is a horizontal face panel 524 made of a strong material, such as wood or metal. Preferably, the horizontal face panel 524 is made from wood, plywood, wood composite materials, or wood or composite materials with polymer coatings. A preferred prior art material for the horizontal face panel 524 is a sheet of high density overlay (HDO) plywood. When the horizontal face panel 524 is made from a wood-based product, the horizontal face panel can be any useful thickness depending on the anticipated load the form will be subjected to. However, thicknesses of 0.5 inches to ⅞ inches are typically used. When the horizontal face panel 524 is made from metal, it is typically made from aluminum or steel. The horizontal face panel 524 can be made from the same material as the first face panel 16 disclosed above. Typically, a plurality of rectangular sheets of plywood are laid side-by-side to form the horizontal face panel 524 of a desired size and configuration.

Disposed on top of the horizontal face panel 524 is a first horizontal insulating panel 526. Typically, a plurality of rectangular sheets of insulating material are laid horizontally side-by-side to form the first horizontal insulating panel 526 of a desired size and configuration. The first horizontal insulating panel 526 can be identical to the first insulating panel insert 62, including being fitted with a plurality of anchor members, such as the anchor members 528, 530 (FIG. 9), each of which is identical to the anchor member 100 (FIGS. 2 and 3). Disposed on top of the first horizontal insulating panel 526 is a horizontal layer of plastic concrete 531. Disposed on top of the horizontal layer of plastic concrete 531 is a second horizontal insulating panel 532. The second horizontal insulating panel 532 can be identical to the first insulating panel insert 62, except the plurality of elongate anchor members, such as the elongate anchor member 100, are omitted from the second horizontal insulating panel or it can be an insulating blanket. Typically, a plurality of rectangular sheets of insulating material or insulating blankets are laid horizontally side-by-side to form the second horizontal insulating panel 532 of a desired size and configuration. Concrete insulating blankets, are commercially available under the designation concrete insulating blankets from Pregis Corp., Lake Forest, IL and concrete curing blankets from Granite City Tool, Waite Park, MN.

Figure 8:
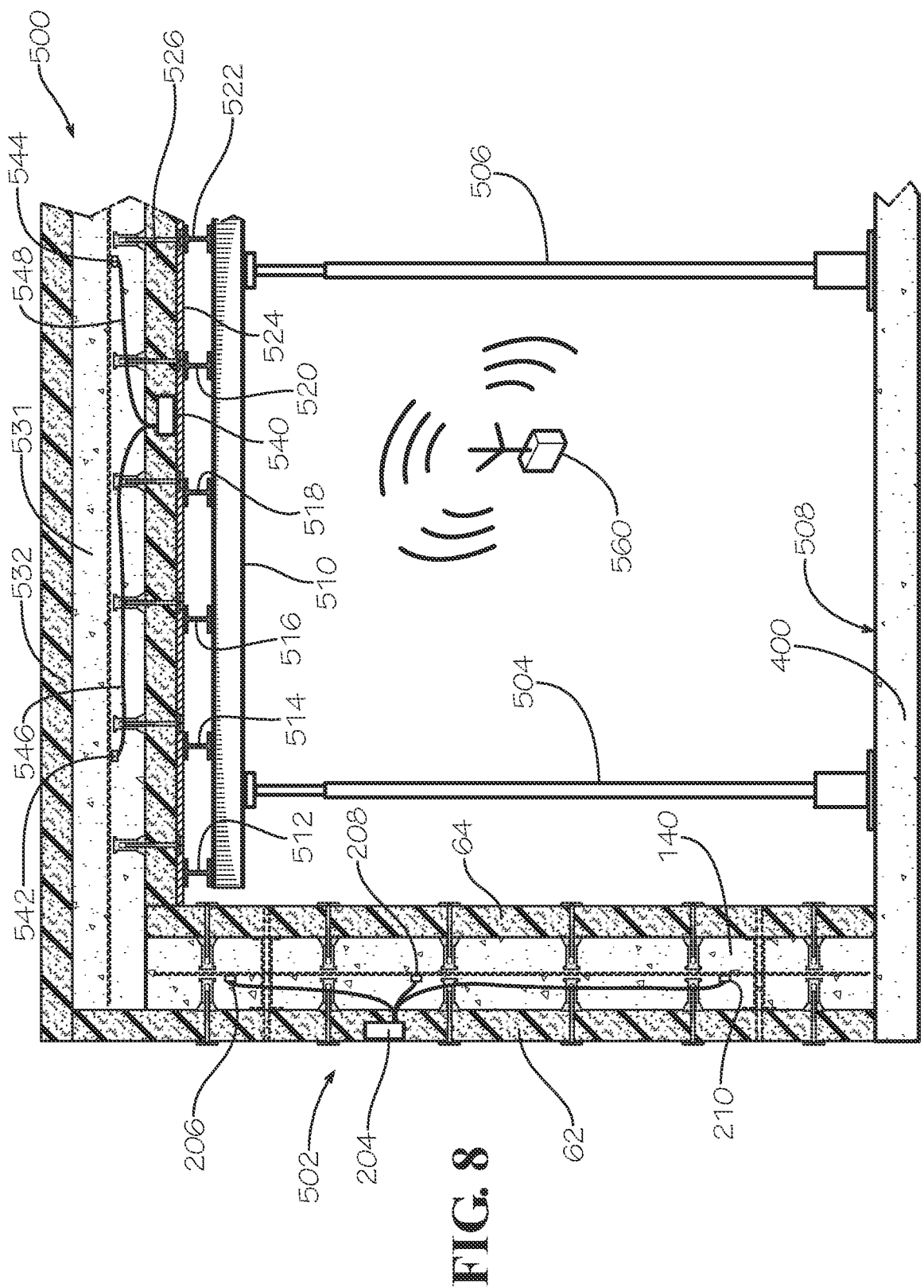
FIG. 8 is a cross-sectional view side view of the removable insulated compound concrete form shown in FIG. 6 shown with an elevated slab being formed with a removable insulated compound concrete form in accordance with the present invention.
Figure 9:
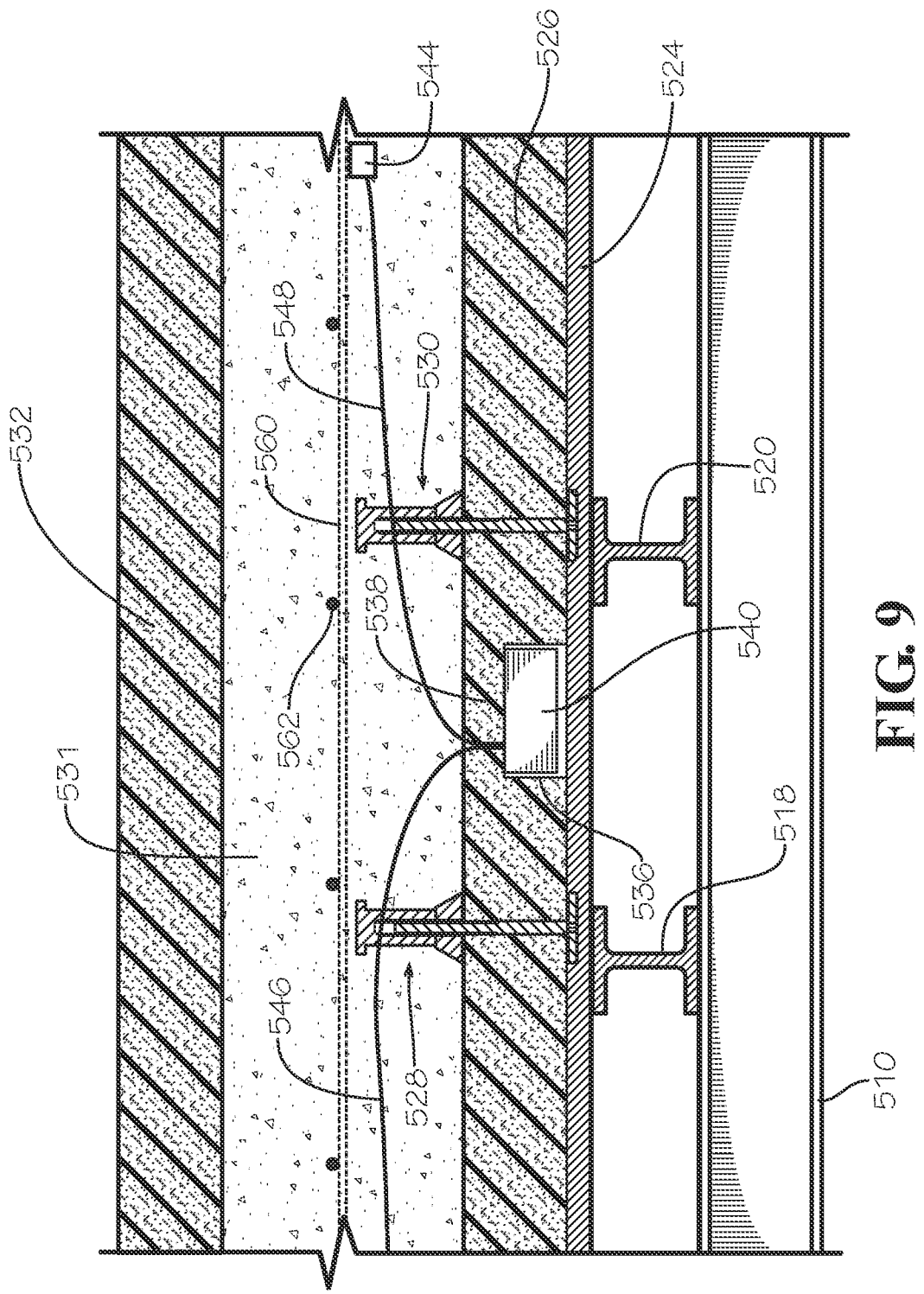
FIG. 9 is a partial detailed cross-sectional side view of the elevated slab removable insulated compound concrete form shown in FIG. 9.
Figure 10:
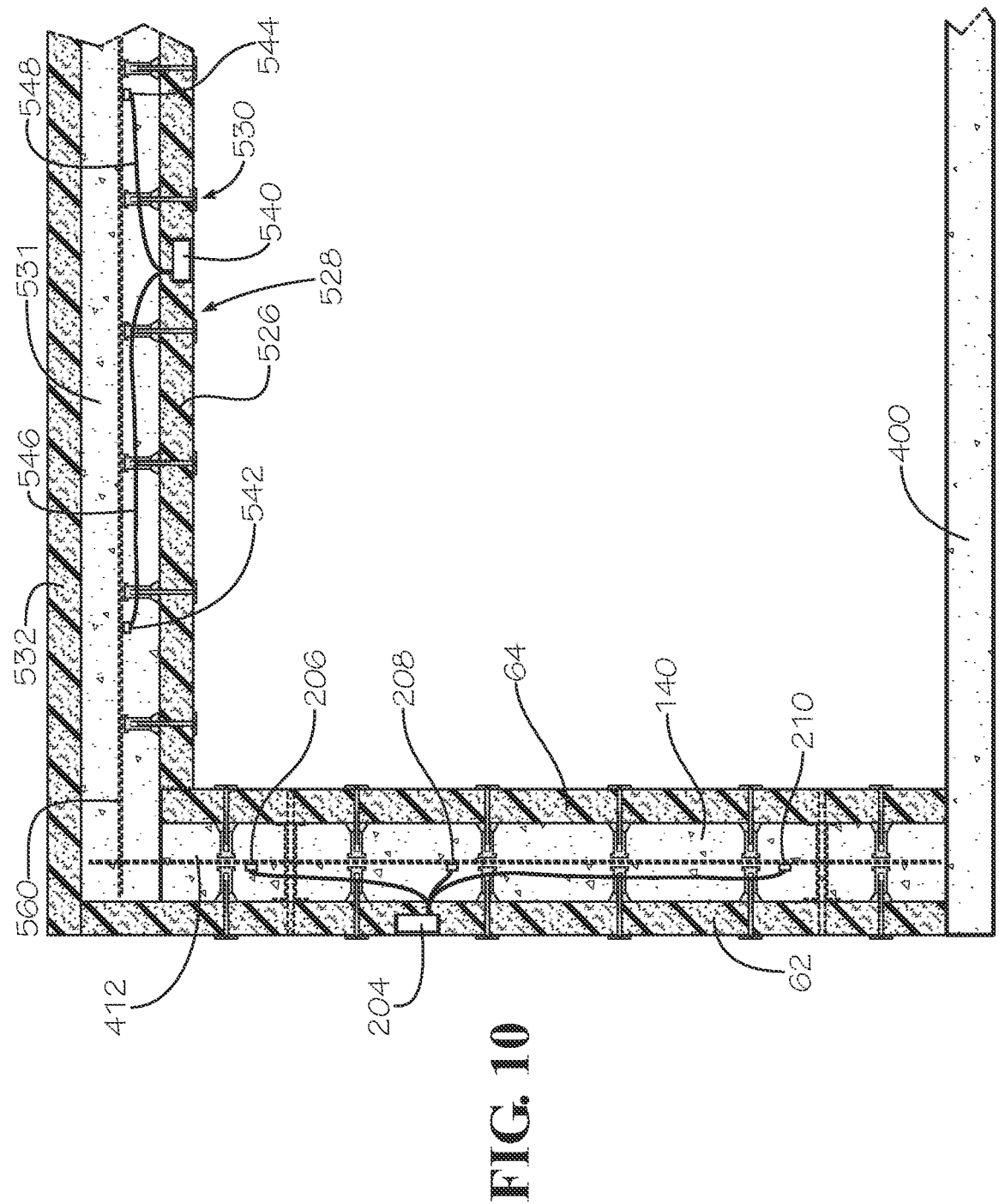
FIG. 10 is a cross-sectional side view of the elevated slab removable insulated compound concrete form shown in FIG. 9 shown with the removable concrete form removed.

Formed in the first horizontal insulating panel 526 is a cavity 536 sized and shaped to accommodate a concrete temperature processing/transmitting module. The cavity 536 should be as shallow as possible so that the portion 538 of the first horizontal insulating panel 62 is not substantially weakened. Disposed in the cavity 536 is a wireless concrete temperature processing/transmitting module 540. The wireless concrete temperature processing/transmitting module 540 is identical to the wireless concrete temperature processing/transmitting module 204 disclosed above. As shown in FIGS. 8-10, a fourth thermocouple 542 is disposed in the left portion of the elevated slab (plastic concrete 528), a fifth thermocouple 544 is disposed in the right portion of the elevated slab (plastic concrete). The fourth thermocouple 542 is connected to the processing/transmitting module 540 be an electric circuit, such as by wires 546. Similarly, the fifth thermocouple 544 is connected to the processing/transmitting module 540 be an electric circuit, such as by wires 548. The wires 546, 548 pass through the first horizontal insulating panel 526 through a hole 550 formed in the first horizontal insulating panel, such as by drilling. It should be noted that while the cavity 536 is in the first horizontal insulating panel 526, it is on the opposite surface away from the concrete forming surface (bottom surface) of the horizontal insulating panel so that the transmitter 540 is outside the concrete receiving space to allow for an increase transmission range and reuse of the processor/transmitter. This location is important because it also protects the processor/transmitter 540 from damage by the fluid concrete 531 during a concrete pour. At the same time, the cavity 536 is on top the conventional plywood face panel 524 and therefore is protected from the external abuse and damage common on a concrete construction site.

Use of the removable horizontal insulated compound concrete form 500 will now be considered. The supporting structure comprising the plurality of post shores, such as the post shores 504, 506, the plurality of beams, such as the beam 510, and the plurality of stringers, such as the stringers 512-522, are erected on the concrete slab 400 as shown in FIGS. 8-11 and in a conventional manner well known in the art. The wires 546, 548 are run through the hole 550 and plugged into the inputs on the processing/transmitting module 540. The processing/transmitting module 540 is then positioned in the cavity 536. The first horizontal insulating panel 526, including a plurality of anchor members, such as the anchor members 528, 530, are preinstalled on the first horizontal insulating panel in the manner described above and the processing/transmitting module 540 is placed on top of the horizontal face panel 524. Depending on the particular requirements of the construction job or predetermined engineering requirements, rebar reinforcement, such as the rebar 560, 562, is assembled on top of the horizontal face panel 524. The thermocouples 542, 544 are positioned as shown in FIGS. 8-10 and are attached to the rebar 562 to hold them in place during concrete placement. Plastic concrete 528 is then placed on top of the first horizontal insulating panel 526 and the top surface of the plastic concrete is finished in a manner well known in the art to provide a smooth, flat surface. The second horizontal insulating panel 532 is then positioned on top of the plastic concrete 528. The plastic concrete 528 is left in the removable horizontal insulated compound concrete form 500 and permitted to at least partially curing during the first curing phase.

The processing/transmitting module 540 and the associated thermocouples 542, 544 disposed in the concrete 528 allow the temperature of the curing concrete 668 to be monitored by a remote receiver/processor 560. The processing/transmitting module 540 wirelessly transfers the temperature data from the thermocouples 542, 544 to the receiver/processor 560, for example, via Bluetooth, Wi-Fi, RFID and any other wireless transmission method. The receiver/processor 560 can then store the data as a function of time. Optionally, the receiver/processor 560 can transmit the received data to a remote central monitoring station, for example, via a 4G cell phone connection. The data from the thermocouples 542, 544 allows monitoring of the maturity of the concrete 528. Additionally, parameters can be set on the data to provide warning, such as a low temperature resulting from the second horizontal insulating panel 532 being blow off the concrete 528. Additionally, the concrete temperature data can be compared to an predetermined temperature profile to determine if it is following the proper concrete curing temperature profile. The data can also provide a separate indication of when the first curing phase and the second curing phase are each completed.

Figure 11:
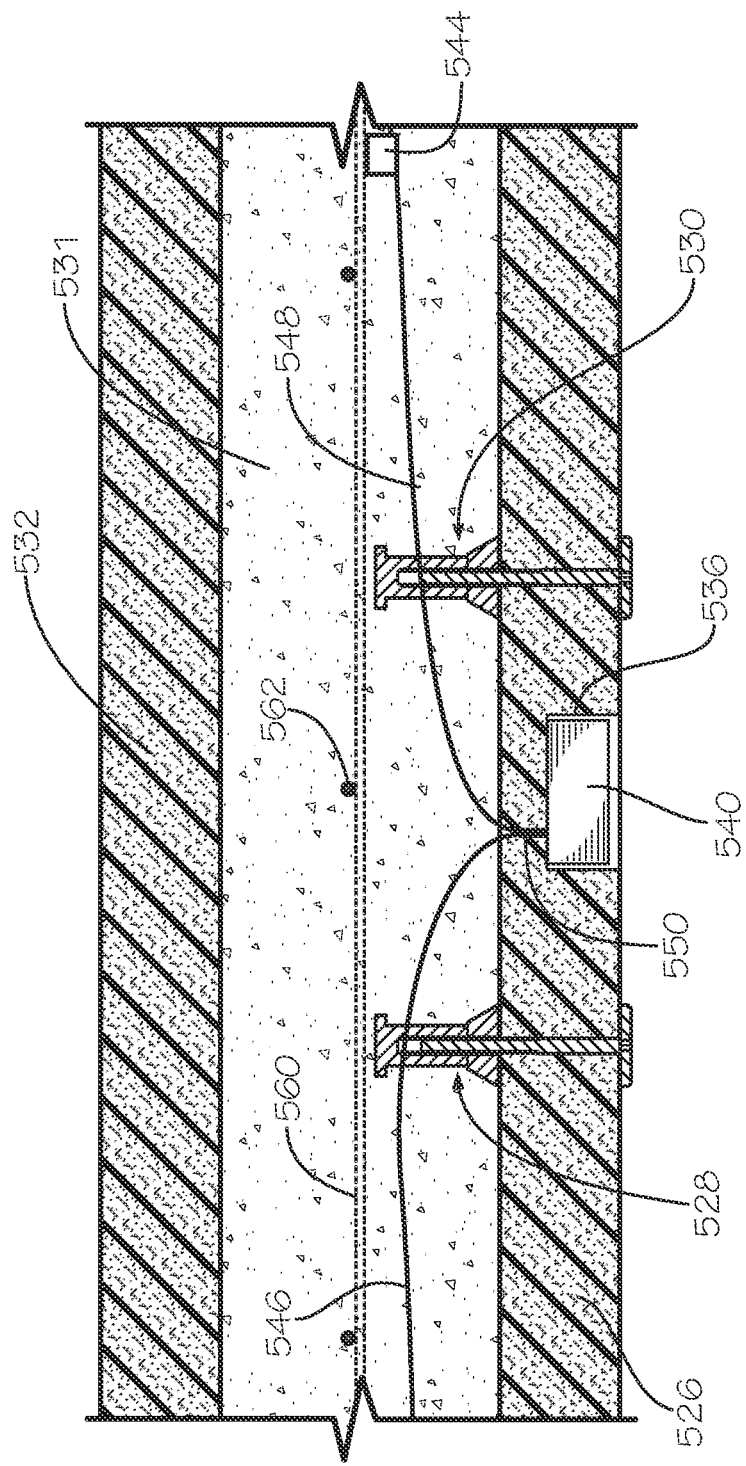
FIG. 11 is a partial detailed cross-sectional side view of the elevated slab removable insulated compound concrete form shown in FIG. 11.

After the first curing phase of the concrete 528 is completed, the supporting structure comprising the plurality of post shores, such as the post shores 504, 506, the plurality of beams, such as the beam 510, and the plurality of stringers, such as the stringers 512-522, are removed and the first horizontal face panel 524 is removed, as shown in FIGS. 10 and 11. During the second curing phase, the first and second horizontal insulating panels 526, 532 remain in place on the concrete 528, as shown in FIGS. 9-11, but there is no supporting structure. After the second curing phase, the second horizontal insulating panel 532 (or insulating blankets) is removed. The second horizontal insulating panel 532 (or insulating blankets) can be removed by merely lifting the second horizontal insulating panel off of the concrete 528. The first horizontal insulating panel 526 can be removed or it can be permanently left in place, if desired. If the first horizontal insulating panel 526 is to be removed, the disk 114 of the plurality of anchor members, such as the anchor members 528, 530, is rotated counterclockwise so that the shaft portion 112 unscrews from the retaining member 122 in the same manner as described above. The elongate anchor member 110 can then be removed and the first horizontal insulating panel 526 can be separated from the concrete 528 in the same manner as described above. If desired, the spacer member 132 can also be removed from the concrete 528. The processor/transmitters 204, 540 can be removed and reused in the same manner as described above.

Figure 12:
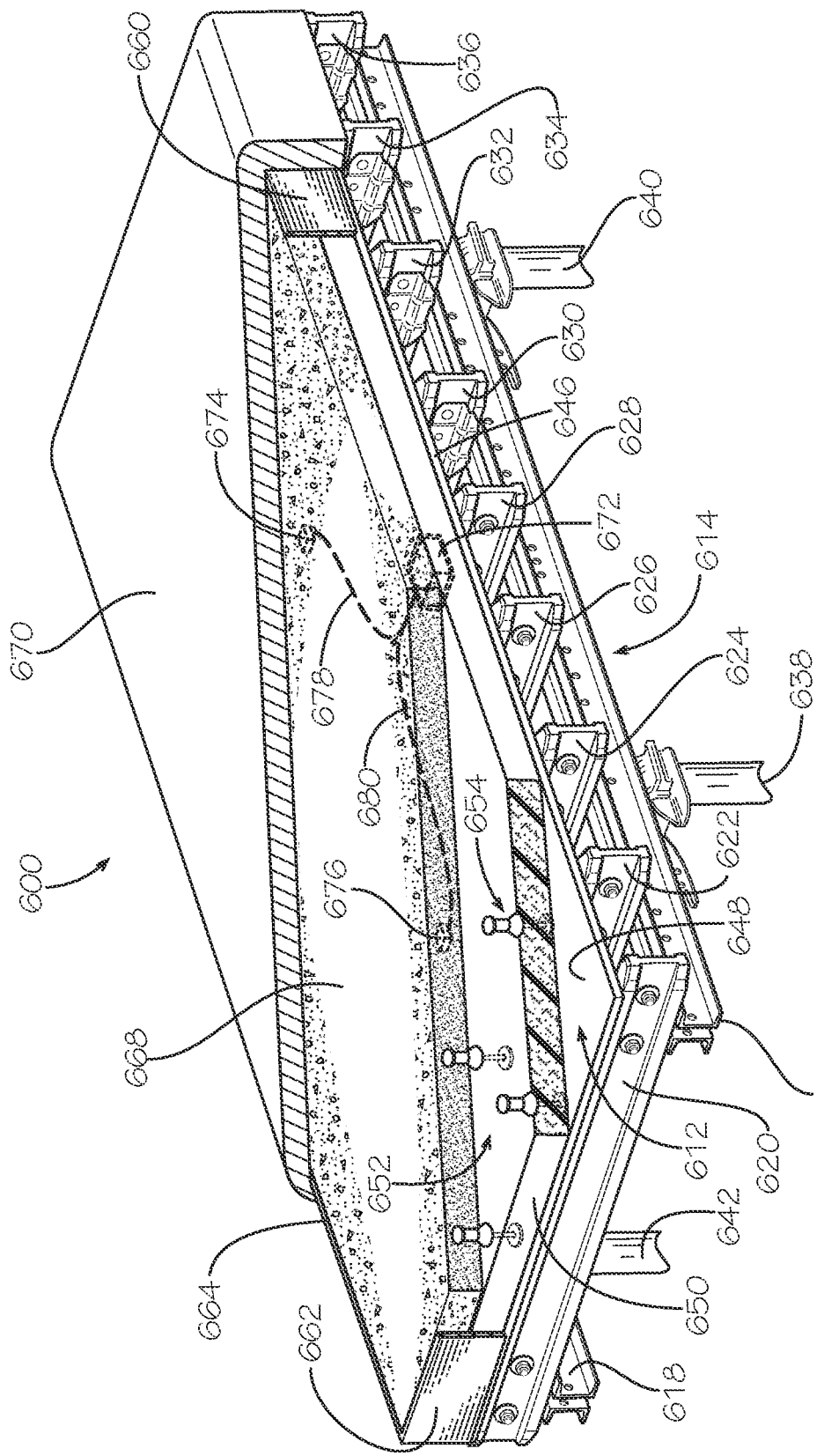
FIG. 12 is a partially broken away perspective view of an alternate disclosed embodiment of a removable insulated compound concrete flying table form in accordance with the present invention.

FIG. 12 is another disclosed embodiment of the present invention. FIG. 12 is a removable horizontal insulated compound concrete form for use in constructing an elevated slab or roof structure using a flying table. Applicant's co-pending U.S. Publication No. 2015/0069664, which discloses an insulated flying table compound concrete form, is incorporated herein by reference in its entirety. There is shown in FIG. 12 an insulated compound flying table concrete form 600 in accordance with the present invention. The insulated compound flying table concrete form 600 comprises a rectangular concrete forming deck 612 and a deck support structure 614. The deck support structure 614 comprises a pair of elongate, longitudinally extending beams 616, 618 that are laterally spaced from each other. The beams 616, 618 are sometimes referred to as the top chord. The deck support structure 614 also comprises a plurality of elongate, transversely extending support beams 620, 622, 624, 626, 628, 630, 632, 634, 636. The support beams 620-636 are attached to the top chord beams 616, 618 by any suitable means known in the prior art, such as by bolting. The deck 612 is attached to the support beams 620-636 by any suitable means known in the prior art, such as by bolding or nailing. The top chord beams 616, 618 are attached to a plurality of adjustable trusses or shore posts, such as the shore posts 638, 640, 642 (a fourth shore post, not shown, is attached at the other corner of the support structure 614). The bottoms (not shown) of the shore post 638-642 include screw jacks (not shown) for adjusting the height of the shore posts. As stated above, there are many different designs for the shore posts 638-642 and deck support structure 614 that supports the deck 612 and they are all suitable for use with the present invention. However, the particular design of the deck support structure 614 and shore post 638-642 is not a critical part of the present invention. It is only necessary that such deck support structure 614 and shore post 638-642 are sufficiently strong to support the deck 612 and the weight of the concrete intended to be placed on the deck and that the deck support structure and shore posts provide the features required such that the deck and deck support structure can be used as a flying table form, such as being height adjustable. The inventive aspect of the present invention does not pertain to the design of the deck support structure 614 or the shore posts 638-642 individually. The inventive aspect of the present invention resides in the design and use of the deck 612 and the design and use of the deck as a portion of a flying table form.

The deck 612 comprises a concrete forming face panel 646, and a layer of insulating material 650 disposed on top of the face panel 646. The face panel 646 is made of any suitable material typically used in prior art flying table concrete forms or any other material (or composite material) that is sufficiently strong to withstand the hydrostatic pressure of plastic concrete applied to it. The face panel 646 can be made from the same materials as the first face panel 16. The face panel 646 has a first primary surface 648.

It is typical for wood, plywood or wood composite panels used for concrete forming panels to include a polymer coating on the surface that contacts the concrete. This provides better concrete release properties to the panel. It is a part of the present invention that a polymer coating is optionally applied to the first primary surface 648 of the concrete forming first panel 646 and that the polymer coating includes heat insulating materials, such as refractory insulating materials. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. It is a part of the present invention that a polymer coating is optionally applied to the first primary surface 648 of the concrete forming face panel 646 and that the polymer coating includes heat reflective materials. Heat reflective materials are made from materials including, but not limited to, mica, aluminum flakes, magnetite, graphite, carbon, other types of silicates and combinations thereof. The above heat reflective materials can be used in any number ways and combination percentages, not just as a single element added to the polymeric material. The heat reflective elements can also be used in conjunction with the ceramic fibers mentioned above in any number of ways and percentage combinations. The heat insulating materials and/or the heat reflective materials can be added to the polymeric material used to coat the first primary surface 648 of the concrete forming face panel 646 in amounts of approximately 0.1% to approximately 50% by weight heat reflective elements, preferably approximately 0.1% to approximately 40% by weight, more preferably approximately 0.1% to approximately 30% by weight, most preferably approximately 0.1% to approximately 20% by weight, especially approximately 0.1% to approximately 15% by weight, more especially approximately 0.1% to approximately 10% by weight, most especially approximately 0.1% to approximately 5% by weight. The polymeric material used to coating the first primary surface 648 of the concrete forming first panel 646 includes, but is not limited to, polyethylene (PE), poly (ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), latex polymers, epoxy resin and the like.

Disposed on top of the face panel 646 is a first insulating panel insert 650. The first insulating panel insert 650 is identical to the first insulating panel insert 62 described above, including a plurality of anchor members, such as the anchor members 652, 654. The anchor members 652, 654 are each identical to the anchor member 100. Typically, a plurality of rectangular sheets of insulating material are laid side-by-side to form the first insulating panel insert 650 of a desired size and configuration. The first insulating panel insert 650 covers, or substantially covers, the first primary surface 648 of the face panel 646. As used herein the term "substantially covers" means covering at least 80% of the surface area of the first primary surface 648 of the face panel 646.

Use of the insulated flying table compound concrete form 600 will now be considered. A particular advantage of the present invention is that the insulated flying table compound concrete form 600 can be used in the same manner as a conventional prior art flying table form. The insulated flying table compound concrete form 600 is erected at a desired location. Of course, multiple decks 612 can be joined together to form a deck of a desired size and configuration with a corresponding supporting structure 614 of an appropriate size to support the multiple deck forms. For example, a plurality of decks 612 are attached end-to-end to form a deck 21 feet wide and 100 feet long. In such a form, the top chord beams 616, 618 are also 100 feet long and sufficient transverse beams, such as the beams 620-636, are added on top of the top chord beams to form a supporting structure for the multiple deck forms 612.

After the insulated flying table compound concrete form 600 is erected in a desired location, side form members 660, 662, 664 (and a fourth side form member not shown) are positioned as desired on the first primary surface 648 of the face panel 646. Plastic concrete 668 is then placed on the first primary surface 648 of the face panel 646 so as to fill the form to a desired depth or thickness, such as up to the top of the side form members 660-664. The surface of the plastic concrete 668 is finished in any desired manner to make it smooth and flat. Then, as soon as practical, a layer of insulating material 670 is placed over the plastic concrete 668 and preferably overhanging the side form members 660-664. The layer of insulating material 670 can be made from the same material as the first insulating panel insert 16.

The second layer of insulating material 670 is preferably a concrete insulating blanket having the insulating properties described above for the first insulating panel insert 16. Concrete insulating blankets, are commercially available under the designation concrete insulating blankets from Pregis Corp., Lake Forest, IL and concrete curing blankets from Granite City Tool, Waite Park, MN.

The first insulating panel insert 650 and second layer of insulating material 670, deck 612 and support structure 614 are left in place for the first curing phase of the concrete 668. After the first curing phase, the deck 612 and support structure 614 are moved downwardly from the first insulating panel insert 650 in a conventional manner known in the art by means of the leg/strut structure 638-642. The first insulating panel insert 650 and second layer of insulating material 670 are left in place during the second phase of curing of the concrete 668, but without the deck 612 and support structure 614. After the second phase of curing, the second layer of insulating material 670 is removed by merely lifting it off of the concrete 668. The first insulating panel insert 650 can be removed or it can be permanently left in place, if desired. If the first insulating panel insert 650 is to be removed, the disk 114 of the plurality of anchor members, such as the anchor members 652, 654, is rotated counterclockwise so that the elongate shaft portion 112 unscrews from the retaining member 132 in the same manner as described above. The elongate anchor member 110 can then be removed and the first insulating panel insert 650 can be separated from the concrete 668 in the same manner as described above. If desired, the spacer member 132 can also be removed from the concrete 668.

Optionally, a processing/transmitting module 672 can be disposed in a cavity formed in the first insulating panel insert 650 and the associated first and second thermocouples 674, 676, respectively, disposed in the concrete 668. The first thermocouple 674 is connected to the processing/transmitting module 672 be an electric circuit, such as by wires 678. The second thermocouple 676 is connected to the processing/transmitting module 672 be an electric circuit, such as by wires 680. This allows the temperature of the curing concrete 668 to be monitored in the same manner as described above.

It should be noted that while the cavity is in the insulating panel 650, it is on the opposite surface away from the concrete forming surface 652 of the insulating panel so that the processor/transmitter 672 is outside the concrete 668 to allow for an increased transmission range and reuse. Also, the plywood face panel 646 covers the cavity housing the processor/transmitter 672. This location is important because it also protects the processor/transmitter 672 from damage by the fluid concrete during a concrete pour. At the same time the cavity and the processor/transmitter 672 are on top the flying table form and therefore protected from the external abuse and damage common on a concrete construction site.

Figure 13:
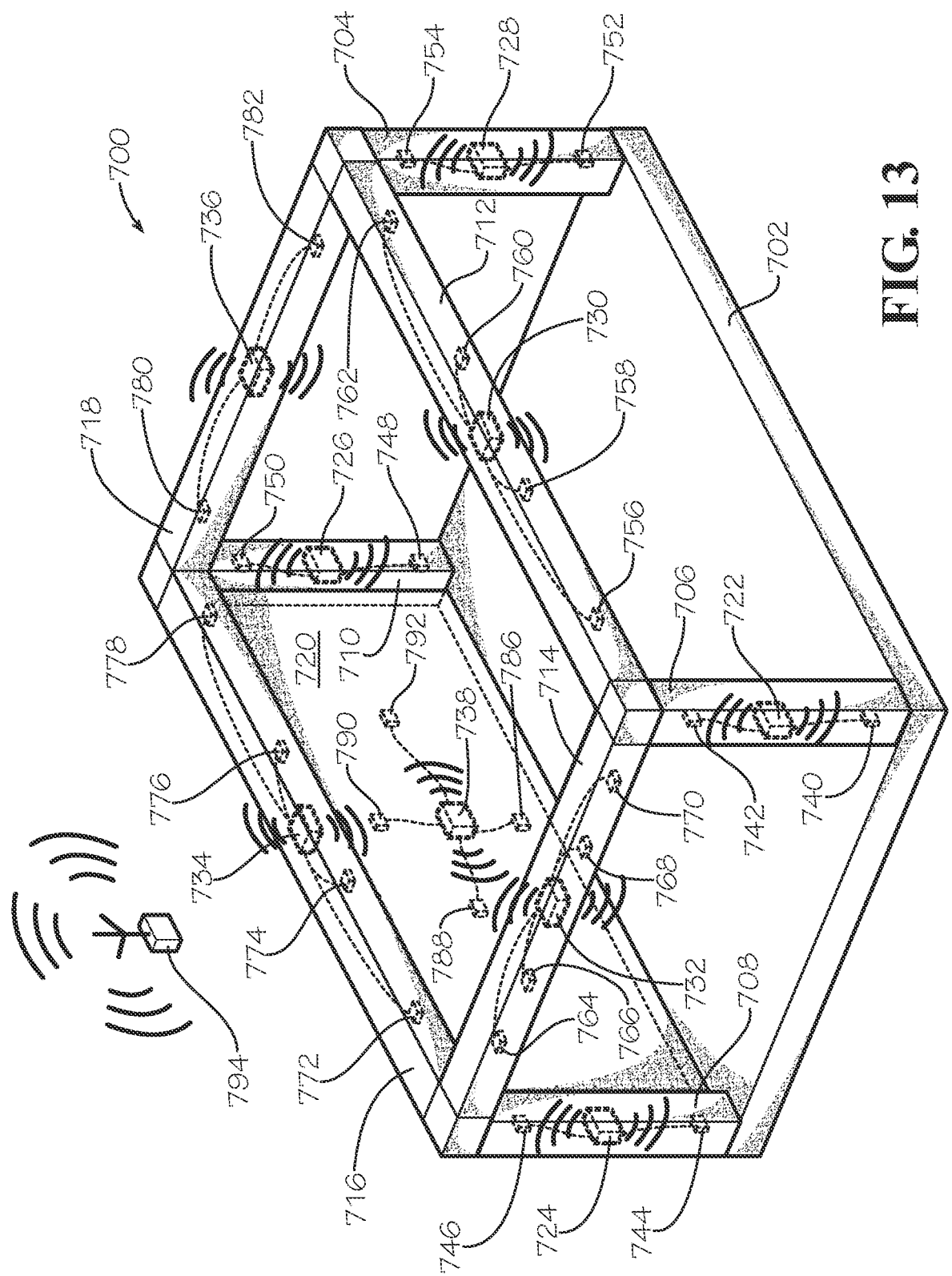
FIG. 13 is a schematic perspective view of disclosed embodiment of a concrete temperature monitoring network in accordance with the present invention.

FIG. 13 is another disclosed embodiment of the present invention. FIG. 13 shows an optional concrete curing temperature monitoring system in accordance with the present invention. There is shown in FIG. 13 a building structure 700 comprising a concrete slab 702, four concrete columns 704, 706, 708, 710, four concrete beams 712, 714, 716, 718 and a vertical concrete wall 720. The concrete columns 704-710 and concrete wall 720 are formed using the removable insulated compound concrete form 10 of the present invention. The concrete beams 712-718 use a combination of the forms 10 and 500 described above. Therefore, the concrete columns 704-710, concrete beams 712-718 and concrete wall 720 are wrapped in insulating material on all sides (as shown in FIG. 13, whereas the removable concrete forms have already been removed). Each of the insulated concrete columns 704-710, concrete beams 712-718 and the concrete wall 720 has a wireless processing/transmitting module 722, 724, 726, 728 (in the columns), 730, 732, 734, 736 (in the beams) and 738 (in the wall). The wireless processing/transmitting module 722 has two thermocouples 740, 742 associated therewith and disposed at different locations in the column 706. The wireless processing/transmitting module 724 has two thermocouples 744, 746 associated therewith and disposed at different locations in the column 708. The wireless processing/transmitting module 726 has two thermocouples 748, 750 associated therewith and disposed at different locations in the column 710. The wireless processing/transmitting module 728 has two thermocouples 752, 754 associated therewith and disposed at different locations in the column 704. The wireless processing/transmitting module 730 has four thermocouples 756, 758, 760, 762 associated therewith and disposed at different locations in the beam 712. The wireless processing/transmitting module 732 has four thermocouples 764, 766, 768, 770 associated therewith and disposed at different locations in the beam 714. The wireless processing/transmitting module 734 has four thermocouples 772, 774, 776, 778 associated therewith and disposed at different locations in the beam 716. The wireless processing/transmitting module 736 has three thermocouples 780, 782 associated therewith and disposed at different locations in the beam 718. The wireless processing/transmitting module 738 has four thermocouples 786, 788, 790, 792 associated therewith and disposed at different locations in the wall 720. Each of the wireless processing/transmitting modules 722-738 are separately monitored remotely by a single receiver/processing unit 794. Each of the thermocouples 740-792 had a separate identification assigned to it by its associated processing/transmitting module. Therefore, the temperature of the concrete adjacent each of the thermocouples 740-792 can be detected, monitored, recorded and mapped by the receiver/processing unit 794 and graphically represented on a monitor (not shown). Since concrete temperature over time can be correlated with concrete maturity, the maturity of the concrete at multiple locations in the building structure 700 can be determined at any period during the concrete curing process. Therefore, phase one curing and phase two curing can be determined for any portion of the building structure 700.

It is noted that the optional transmitters 722, 724, 726, 728 (in the columns), 730, 732, 734, 736 (in the beams) and 738 (in the wall) are set within the foam panels attached to the concrete. As such they have appropriate transmission range, from multiple locations or floors to reach the central receiver/processing unit 794. The critical feature of the present invention is that if the wireless transmitters were embedded in concrete as in the current art, the range of transmission would be severely limited and a multitude of receiving units 794 would be required. And, of course, the wireless processing/transmitting modules 722-738 can be reused.

While FIG. 13 shows a small sample of certain concrete elements used in a building, the elements of this figure could be multiplied and arranged in a horizontal fashion to cover a large building footprint or a vertical fashion to cover a multistory building or both. Various concrete elements can be cast in place as shown in FIG. 13 or they can be concrete elements precast offsite or onsite and assembled into or attached to a structure.

The receiving unit 794 can be attached to a monitor or a computer for local data storage and monitoring. Alternatively and more preferably the unit 794 could have a cellular wireless transmission component such as a GSM sim card, that would transmit the date over the internet to an offsite central location database. As such the temperature curing data would be available on a common platform accessible over the internet in a shared mode between many parties interested, such as the concrete contractor, the general contractor, the engineer of record, the concrete supplier, the architect, the owner etc.

Moreover the locations of each thermocouple and each transmitter can be plotted or mapped in a BIM (Building Imaging Modeling) software that shown in real time the as built concrete elements with the tracking temperature of the curing process for each one. As such the temperature data provides a more precise and more predictable concrete performance in the field. This data provides a more precise time of removing the insulating panels or the insulating blankets. Also it can be used as a built in alarm system if the concrete temperature dropped rapidly as a result of an insulating panel or blanket removal or failure. If such event was to occur the area affected could be allowed more time to cure or shoring be kept in place longer. In essence this invention would take the guess work out of determining when concrete is cured or not to the desired level. It can provide an audit trail to increase the concrete performance over time and help refine the concrete mix designs.

Advantages of the present invention over existing technology:

Utilizing inherent (embedded) energy in portland cement powder to Self-Anneal concrete and eliminate the thermal shock from early age curing stage Accelerated maturity of all concretes most significantly High SCM Replacement Concretes Reducing and Eliminating the Weather Variables from the concrete placing and curing Reducing and Eliminating Micro cracking due to initial thermal shock—early development Reducing and Eliminating the Temperature Gradient from Surface to Core Reducing and Eliminating the Moisture Gradient from Surface to Core Reducing and Eliminating the Internal Restraint in Concrete Reducing and Eliminating the Thermal Stresses from daily temperature fluctuations Improving Physical Properties, such as compressive strength, flexural strength, permeability, etc.

Reducing and Eliminating Cracking

Reducing and Eliminating the Carbonation in Concrete

Improving the Durability, Sustainability and Lifecycle of Concrete Structures

Creating an optimal environment to maximize hydration in OPC, MPC concretes and UHPC Accelerated strength gain with both OPC and very low carbon footprint concretes Improve the utilization of pozzolans throughout concrete construction lowering $CO_2$ impact Reduce $CO_2$ impact from the Concrete Cement by as much as 60%

Protecting concrete long term from environmental effects

Allows the use of UHPC placement and curing in the field

Creates a denser paste matrix by providing an optimum hydration environment

Can be used on any jobsite to improve concrete performance

Figure 14:
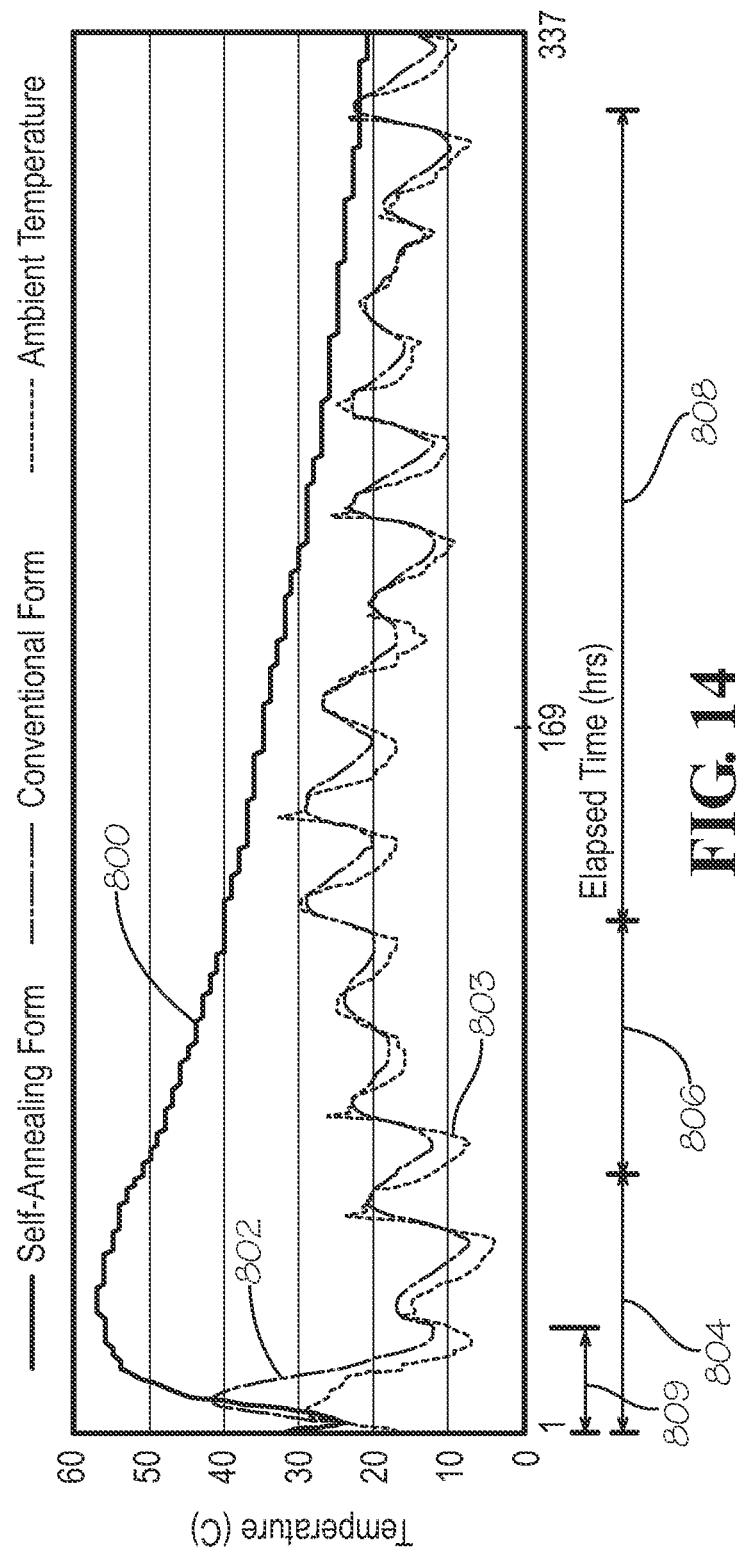
FIG. 14 is a disclosed embodiment of a graph of concrete temperature versus elapsed concrete curing time of a curing temperature profile for concrete in accordance with the present invention. Examples of ambient temperature and concrete temperature cured in a conventional, non-insulated concrete form are also shown on the graph.

FIG. 14 is a disclosed embodiment of an exemplary graph of concrete temperature 800 from concrete placed and cured in an insulated form (shown as a solid line) as a function of time. Also, shown on the graph is an example of ambient temperature 803 (shown as a dotted line) as a function of time. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. The peaks and troughs of the ambient temperature represent the daily (i.e., day to night) fluctuation of ambient temperature.

Also, shown on the graph is an example of concrete temperature 802 (shown as a discontinuous line) where concrete has been placed and cured in a conventional, un-insulated form as a function of time. As can be seen in this graph, the temperature 802 of the un-insulated concrete placed in a conventional form, initially increases quite rapidly over a relatively short time, generally in the first 12-18 hours. As the internal heat of hydration is lost to the environment through the conventional un-insulated forms, the concrete reaches a peak temperature, generally overnight and then it drops rapidly to the ambient temperature. The rapid temperature drop causes the concrete to shrink. At this stage of concrete curing, the concrete has not gained enough strength to be able resist the temperature shrinkage. The temperature shrinkage forces are greater than the concrete tensile strength causing the concrete to crack. Internal steel reinforcement is placed within concrete to resist temperature shrinkage cracking forces. This rapid cooling creates a temperature shock and leads to thermal shrinkage that causes what the industry refers to as concrete temperature shrinkage cracking. After the initial heat loss, as ambient temperature rises on the following day, the conventional un-insulated concrete form absorbs heat from the environment and the concrete temperature rises to a second peak temperature, lower than the first peak temperature, and as the ambient temperature drops overnight, the concrete heat is again lost to the environment through the uninsulated concrete form. This process continues from day-to-day following the diurnal temperature swings. The diurnal temperature fluctuations place thermal stresses on the concrete at a time when the concrete tensile strength is lower than the thermal stresses causing the initial temperature shrinkage cracking to proliferate. Sulfates, salts and moisture penetrate cracked concrete faster than dense and non-cracked concrete. Through the cracks moisture and salt prematurely reach the steel reinforcement, which cause corrosion. Over time this is a leading cause of concrete failure. As used herein, the temperature drop that takes place in the time period shown as 809 in FIG. 14 is called the "Initial Thermal Shock".

By comparison, the temperature concrete placed and cured in an insulated form, as can be seen in this graph 800, initially increases quite rapidly over a relatively short time, such as 12 hours to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 20° C., preferably at least 25° C., preferably at least 30° C., preferably at least 35° C., preferably at least 40° C., preferably at least 45° C., preferably at least 50° C., preferably at least 55° C., preferably at least 60° C. or preferably at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C. about 60° C. or about 60 to about 70° C. For concrete having a relatively high amount of pozzolan replacement for Portland cement, the maximum concrete temperature may be higher. Furthermore, it is desirable that the temperature of the concrete is preferably maintained above approximately 20° C., preferably above approximately 25° C., preferably above approximately 30° C., preferably above approximately 35° C., preferably above approximately 40° C., preferably above approximately 45° C., preferably above approximately 50° C., preferably above approximately 55° C. or preferably above approximately 60° C. for 1 to approximately 4 days from the time of concrete placement, preferably 1 to approximately 3 days from the time of concrete placement, more preferably about 24 to about 48 hours from the time of concrete placement. It is also desired that the temperature of the concrete is preferably maintained above approximately 20° C. for 1 to approximately 7 days from the time of concrete placement, preferably above approximately 25° C. for 1 to approximately 7 days from the time of concrete placement, preferably above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; preferably 1 to approximately 5 days from the time of concrete placement, more preferably for 1 to approximately 7 days from the time of concrete placement, most preferably for 1 to approximately 14 days from the time of concrete placement, especially approximately 3 to approximately 14 days from the time of concrete placement and more especially approximately 7 to approximately 14 days from the time of concrete placement. It is also desired that the temperature of the concrete be maintained above ambient temperature for approximately 3 days, preferably approximately 5 days, more preferably approximately 7 days and most preferably approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The insulating material is preferably kept on the curing concrete until the concrete tensile strength is greater than the temperature shrinkage stresses. At this point the concrete is strong enough such that cracking due to temperature shrinkage will be greatly reduced or eliminated from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 14 relative to ambient temperature. Thus, as used herein the term "temperature profile" includes retaining the heat generated by the cement hydration reaction so as to increase the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions. The term "temperature profile" includes the specific ranges of temperature increase and ranges of temperature decrease over ranges of time as set forth above with respect to FIG. 14. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees×hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater.

The graph of concrete temperature 800, as shown in FIG. 14, is the type of data that is produced by monitoring the concrete temperature of the building structure 700 using the thermocouples 740-792, the wireless processing/transmitting modules 722-738 and the receiver/processing unit 794. The graph 802 is for the same concrete cured in a conventional, uninsulated concrete form. The graph 803 is an example of ambient temperature fluctuations. A graph, such as shown in FIG. 14, can be produced for each of the thermocouples 740-792. This data allows a contractor to determine when the concrete curing has completed phase one curing, so that removable concrete forms and/or supporting structure can be removed, and when phase two curing has been completed, so that insulating material can be removed from the concrete, if desired. For example, the portion of the graph of concrete temperature 800 designated at 804 corresponds to phase one curing and the portion designated at 806 corresponds to phase two curing; preferably the portion designated at 806 and 808 corresponds to phase two curing. By knowing when removable concrete forms or supporting structure can be safely removed, a contractor can move the concrete forms or supporting structure to other constructions projects or return the concrete forms or supporting structure to the company from which it is rented. This allows the contractor to keep up with constructions schedules while still benefitting from the advantages associated with insulated concrete curing that retains the heat of hydration of the curing hydraulic cement.

A feature of the present invention is the elimination of the terminal shock caused by the rapid heat loss from the concrete to the environment when placed in a conventional form. As seen in temperature graph 802 of concrete cured in a conventional concrete form, the graph starts at approximately the same temperature point then as the cement hydration reaction takes place the concrete temperature raises to a maximum point after which it drops sharply to approximate the level of the ambient temperature marked by the designation 809. The thermal shock shown in the curve 803 during the time lapse 809 is defined by a peak triangular shaped temperature profile. On the up-slope of the peak profile, the temperature rises rapidly until it reaches a maximum point. During this time the concrete expands in volume. The second portion of the thermal shock temperature profile 802; i.e., portion 809 of the downslope, shows the concrete temperature cools off due to heat being lost to the environment. As a result, the concrete shrinks in volume. At this stage of the concrete curing process the concrete has gained only marginal compressive strength, generally less than 50% of ultimate compressive strength. The shrinkage forces are far greater than bonding forces, which produce internal concrete strength. Therefore, the internal stress of the temperature shrinkage causes concrete to crack. At this stage the cracking is at a nano or micro level. However with time these cracks are the significant cause of concrete deterioration and ultimately concrete failure. Concrete suffering from these problems has a significantly reduced useful service life.

A novel aspect of the present invention is that in the temperature profile 800, the insulating panels retain the heat of hydration, which causes the internal concrete temperature to raise to a maximum temperature above that of the conventional concrete form. However, the last portion of the temperature peak builds slower resulting in a smoother curve rather than a peak curve. Once this maximum temperature level is reached, the same concrete mix in an insulated form in accordance with the present invention maintains the maximum temperature for a longer time after which due to relatively slow heat loss to the environment the concrete temperature slowly drop over time. During the elapsed time 804 and 806 the concrete achieves greater and sufficient compressive strength which allows it to better withstand the internal forces and stresses temperature shrinkage caused by the gradual cooling. Depending on the ambient temperature and the site conditions, the elapsed time 806 could be a short as two or three days to as long as two weeks.

It is noted that the initial thermal shock experienced by concrete placed and cured in a conventional, uninsulated form shown in the temperature 802 graph is not present in the concrete cured in the insulated form temperature graph 800.

Table 1 shows the compressive strength difference between the Self-Annealed Concrete temperature charts 800 compared to the conventional non-insulated form cured temperature concrete chart 802.

TABLE 1

| Concrete Mix | Form/ Curing Type | Compressive Strength (psi) | | | | |
|---|---|---|---|---|---|---|
| | | 8 Days | 28 days | 58 days | 90 days | 14 Months |
| 540 lbs PC | Conv. Form | 3,240 | 4,660 | 5,640 | 6,190 | 6,810 |
| 120 lbs FA | C-39 Lab | 3,170 | 5,555 | 5,960 | 7,360 | n/a |
| w/cm = 0.42 | Self-Annealing | 6,180 | 6,610 | 6,860 | 6,890 | 7,980 |

Table 2 is a concrete maturity table showing the maturity of the concrete of the chart 800 and 802.

TABLE 2

| | | 80/20 Concrete Mix (540 lbs. OPC, 120 lbs. FA) | | |
|---|---|---|---|---|
| Actual Age | | Conventional Form Chart 802 | C-39 Lab Curing | Self-Annealing Form Chart 800 |
| Age (days) | Age (hours) | Maturity °C.-Hrs. | Maturity °C.-Hrs. | Maturity °C.-Hrs. |
| 0.33 | 8 | 273 | 218.5 | 252 |
| 0.75 | 18 | 574 | 495.5 | 763 |
| 1 | 24 | 656 | 623 | 1096 |
| 2 | 48 | 954 | 1070.5 | 2441 |
| 3 | 72 | 1340 | 1523.5 | 3683 |
| 7 | 168 | 3524 | 3263.5 | 7589 |
| 14 | 336 | 6512 | 5918.5 | 12116 |
| 28 | 672 | 13987 | 13544.5 | 19620 |
| 56 | 1344 | 29610 | 29422.5 | 35571 |
| 90 | 2160 | 52688 | 48615 | 59632 |

Figure 15:
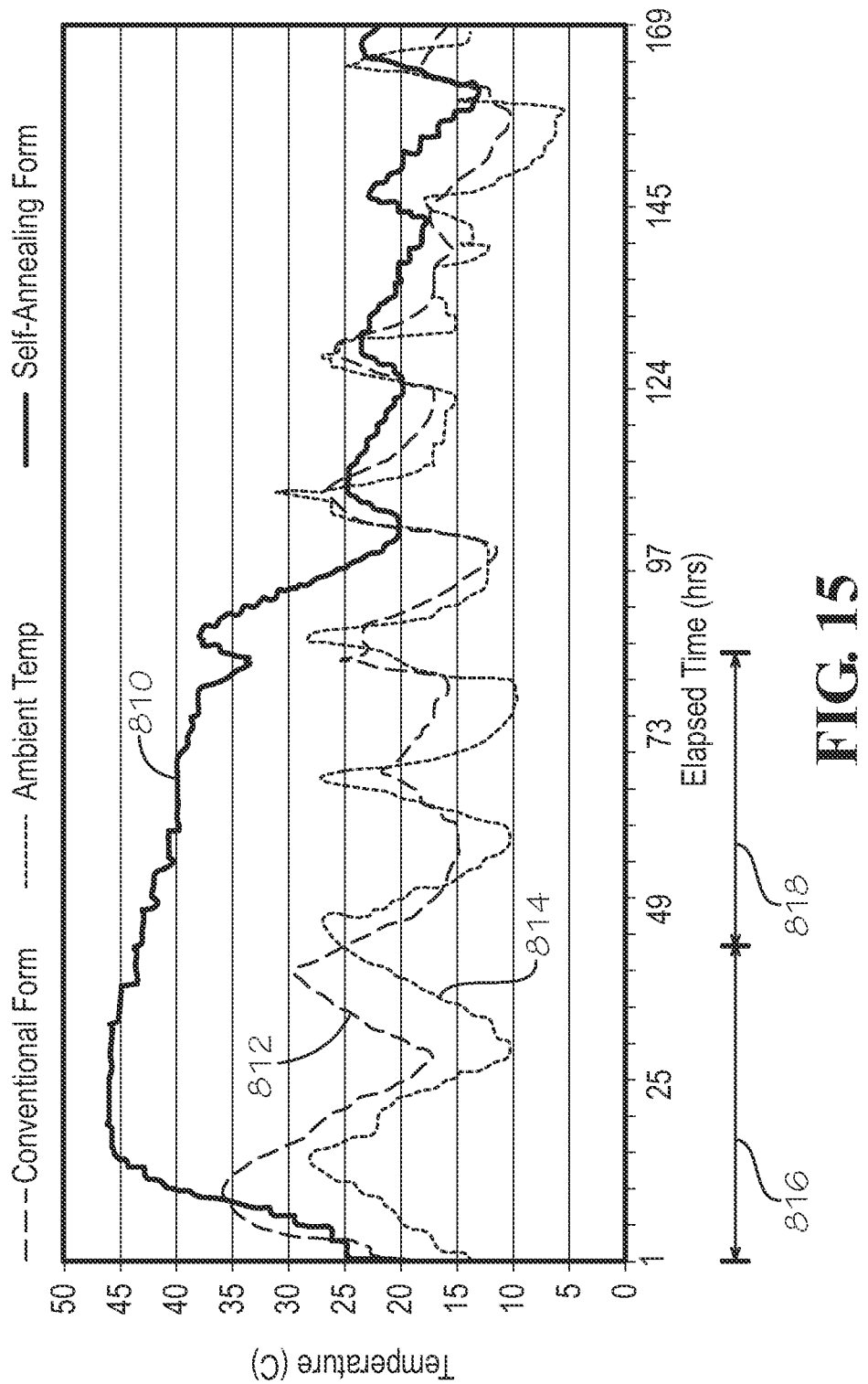
FIG. 15 is another disclosed embodiment of a graph of concrete temperature versus elapsed concrete curing time of a curing temperature profile for concrete in accordance with the present invention. Examples of ambient temperature and concrete temperature cured in a conventional non-insulated concrete form are also shown on the graph.

The graph of concrete temperature 810, as shown in FIG. 15, is another example of the type of data that is produced by monitoring the concrete temperature of the using thermocouples, wireless processing/transmitting modules and the receiver/processing unit in accordance with the present invention. The graph 812 is for concrete cured in a conventional, uninsulated concrete form. The graph 814 is an example of ambient temperature fluctuations. For example, the portion of the graph of concrete temperature designated at 816 corresponds to phase one curing and the portion designated at 818 corresponds to phase two curing.

In graph 810 of FIG. 15, there is shown the same type of temperature gain that reached a maximum point after approximately 12 hours. Then, the temperature levels off after which it starts to gradually drop. As noted in the graph, at the approximate 74 hours, the temperature drops relatively sharply. This temperature drop is due to the removal of the insulating panels or insulating blankets from the curing concrete object or structure. Then, it should be noted that as the ambient temperature rises the concrete absorbs heat from the sun and the environment and the temperature profile shows a slight up-slope until it reaches a second maximum temperature. After the second maximum temperature, the concrete temperature drops more rapidly until the next day when the ambient temperature again raises and the concrete again absorbs heat from the environment. As previously, noted the insulating panels are removed at the elapsed time 818 at approximately three days. At that point the concrete achieves over 70% of its conventional 28 day compressive strength.

The Self-Annealing Concrete process utilizes the heat generated by the cement hydration reaction resulting in an autocatalytic reaction where the temperature is elevated until most cement particles are hydrated. The cement hydration rate is increased to more fully hydrate cement at an early stage. This accelerates strength gain and maturity while maintaining the moisture, then gradually allows concrete to cool to ambient temperature or to a point where the concrete strength can withstand thermal stresses prior to exposing it to the fluctuating temperatures of the environment. The autocatalytic reaction produces more calcium hydroxide early on for reaction with SCMs. Higher temperature increases the SCMs' reaction rate. Moisture retention and more uniform concrete temperature minimizes shrinkage and thermal stresses. Therefore, Self-Annealing Concrete™ has enhanced physical properties in the hardened concrete due to more complete hydration, reduction or elimination of calcium hydroxide and reduced stresses during the curing process. By using higher levels of SCMs in concrete, the carbon footprint can be reduced by efficient use of cement, especially portland.

Figure 16:
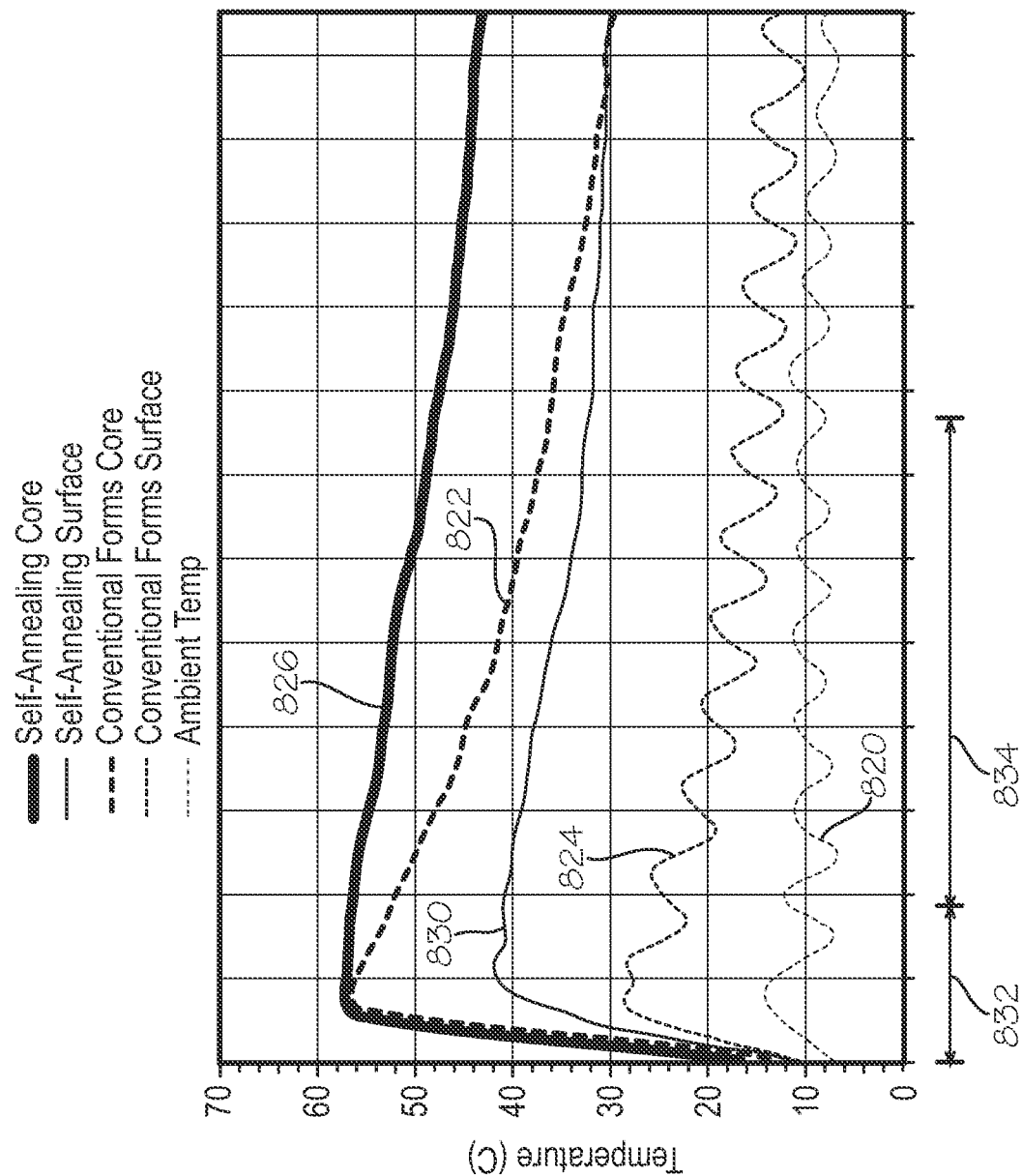
FIG. 16 is another disclosed embodiment of a graph of concrete temperature versus elapsed concrete curing time of a mass concrete curing temperature profile for concrete in accordance with the present invention. One pair of curves is for mass concrete cured in a conventional manner with temperature sensors located at the core and at the surface. Another pair of curves is for mass concrete cured in accordance with the present invention with temperature sensors located at the core and at the surface. An example of ambient temperature is also shown on the graph.

The present invention is particularly useful for use with mass concrete as would be encountered, for example, when constructing bridge piers or other massive concrete structures. FIG. 16 is an example of a graph of mass concrete temperature with one temperature sensor located at the core of the mass concrete and another temperature sensor located at the surface of the mass concrete. The graph 820 shows the fluctuations of ambient temperature. The graph 822 is a temperature curve for mass concrete wherein a temperature sensor is located at the core of the mass concrete; the graph 824 is a temperature curve for mass concrete wherein a temperature sensor is located at the surface of the mass concrete. The graphs 822, 824 are of mass concrete formed and at least partially cured in conventional uninsulated removable concrete forms. As can be seen from these graphs 822, 824, there is an initial sharp increase in temperature as the hydration process is initiated. However, the temperature at the core increases faster and reaches a higher maximum temperature that is found at the surface. The difference is known as the temperature differential or gradient. For mass concrete, it is important that the temperature differential between the surface and the core not exceed a certain amount (that amount is different depending on a number of factors, such as mix design, concrete thickness and the like). However, the industry standards provides that the temperature differential should not exceed 30° C. Current state of the art for controlling the temperature differential in a mass concrete pour employs cooling systems with refrigerant lines that are placed in the core of the concrete. The refrigerant lines cool the concrete core to reduce the temperature differential from the core to the surface. Such a cooling method is very expensive and has poor ability to monitor the concrete temperatures. As can be seen in graph 822 (FIG. 16), the core temperature rises significantly and then drops gradually over time. The surface temperature of graph 824 shows the surface temperature rising to a level far below the core temperature and then dropping in response to heat loss to the environment. The temperature differential between the core 822 and surface 824 is greatest when the concrete is in the initial phase of concrete curing. As such, during the period 832 of curing stage, the concrete strength at the core of graph 822 is far greater than the concrete at the surface of graph 824. The concrete of graph 824 loses heat to the environment and has significantly weaker compressive strength during the period 832. Therefore, while the temperature is still rising at the core of graph 822, the temperature is dropping at the surface of the concrete in graph 824. The concrete at the core is still expanding due to the increase in temperature, but the concrete at the surface is starting to shrink due to the reduction in temperature. Therefore, the restraining forces of the stronger concrete of graph 822 keep increasing and push against the weaker concrete 824 that is shrinking during the same curing phase 832. Also, the temperature differential between the core and the surface at this point is the greatest. As the reaction progresses into the second phase of curing 834, the core temperature gradually drops over time causing the concrete to shrink. The surface concrete temperature graph 824 is now approximating the ups and down of ambient temperature 820, at such during the day gaining heat and expanding against the concrete at the core and at night the surface concrete cooling. Such cooling causes shrinkage and these expanding and contracting forces between the daily temperature variations of the surface concrete in the graph 824 versus the concrete of the core in graph 822 causes temperature shrinkage cracking. This cracking reduces the useful life of the concrete and is a significant reason for the failing infrastructure that our country is currently facing.

Controlling the temperature differential is essential for mass concrete because if it is not controlled significant cracking of the concrete can result. This can be due to, for example, shrinkage cracking when the strength of the concrete is relatively weak. Insulating blankets are sometimes placed over the exterior of the concrete forms for mass concrete in an attempt to reduce the amount of heat loss from the surface of the mass concrete, which would result in an increase in the temperature differential. However, the insulating blankets, if used at all, are removed when the concrete forms are removed. And, concrete forms are often removed from mass concrete at an early of its curing in order to facilitate constructions schedules. The concrete temperature graphs 822, 824 show that the temperature differential; i.e., the difference in the height of the graph 824 and the graph 822, is at an unsafe level.

The graph 826 is a temperature curve for mass concrete wherein a temperature sensor is located at the core of the mass concrete; the graph 830 is a temperature curve for mass concrete wherein a temperature sensor is located at the surface of the mass concrete. The graphs 826, 830 are of mass concrete formed and at least partially cured in accordance with the present invention, such as using the removable insulated compound concrete form 10. As can be seen from these graphs 826, 830, there is an initial spike in the concrete temperature. However, the difference in the core temperature and the surface temperature for the graphs 826, 830 is significantly smaller than the difference in the core temperature and the surface temperature 822, 824, particularly in the early stages of concrete curing when the concrete strength is relatively weak. The temperature differential for the graphs 826, 830 are within the design parameters for this mass concrete. Furthermore, since the insulation portions of the removable insulated compound concrete form 10, such as the first and second insulating panel inserts 62, 64 remain in place after the removable concrete forms 12, 14 are removed, the insulating panels can preserve the acceptable temperature differential for mass concrete. Then, if desired, the insulating panels can be removed from the mass concrete after the temperature of the core has been reduced to a safe level. Thus, the present invention provides a heretofore unknown method and apparatus for forming mass concrete in a safe and efficient manner.

Importantly, the present invention reduces or eliminates the thermal shock from concrete on the surface of the graph 830. As compared to the conventional form graph 824, the concrete temperature does not drop rapidly but is substantially maintained and then slowly drops over time. The temperature differential between the core and the surface is stable as temperature in both charts slowly drops over time. The present invention eliminates the excessive thermal shock associated with the graph 824 during the curing phase 832. It also greatly reduces the thermal stresses between the core and the surface resulting in reduced shrinkage cracking.

Although the present invention is illustrated as being applicable to vertical wall forming systems, it is also specifically contemplated that the present invention can be used with removable forms for building concrete columns, piers, elevated slabs, bridge decks, high-rise floors, tilt-up panels, precast concrete structures, flying table forms, and any other concrete object or structure.

As another example of the present invention, a precast plant can cast individual elements in molds that have insulating panels lining such molds. The molds can be stripped and the insulating panels can be left in place for the duration of the second curing phase. Each concrete element can have a wireless transmitters with multiple sensors attached to it. The precast plant can place multiple elements in a yard and let them cure over time. The central receiving unit 794 can collect data from the entire inventory of the concrete elements. The plant thereby has the temperature data to know when each element has achieved its desired physical properties. Significantly, the thermal shock associated with the rapid heat loss is eliminated along with it the associated temperature shrinkage cracking.

While the present invention can be used with conventional concrete mixes; i.e., concrete in which portland cement is the only cementitious material used in the concrete, it is preferred as a part of the present invention to use the concrete, plaster or mortar mixes that use reduced amount of portland cement and increased amounts of supplementary cementitious materials. Concrete is a composite material consisting of a mineral-based hydraulic binder which acts to adhere mineral particulates together in a solid mass; those particulates may consist of coarse aggregate (rock or gravel), fine aggregate (natural sand or crushed fines), and/or unhydrated or unreacted cement. Specifically, the concrete mix in accordance with the present invention comprises cementitious material, aggregate and water sufficient to at least partially hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ of concrete (177 kg/m$^3$) to 1,100 lbs/yd$^3$ of concrete (650 kg/m$^3$) of concrete. The water-to-cementitious material ratio by weight is usually approximately 0.25 to approximately 0.7. Relatively low water-to-cementitious material ratios lead to higher strength but lower workability, while relatively high water-to-cementitious material ratios lead to lower strength, but better workability. Aggregate usually comprises 60% to 80% by volume of the concrete. However, the relative amount of cementitious material to aggregate to water is not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more.

The aggregate used in the concrete used with the present invention is not critical and can be any aggregate typically used in concrete including, but not limited to, aggregate meeting the requirements of ASTM C33. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one or more pozzolans; and more preferably portland cement, slag cement and one or more pozzolans. The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more pozzolanic materials. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Hydraulic cement is a material that can set and harden submerged in water by forming insoluble products in a hydration reaction. Other hydraulic cements include, but are not limited to, belite cement (dicalcium silicate), phosphate cements and anhydrous gypsum. However, the preferred hydraulic cement is portland cement.

Self-Annealing Concrete™ is a process in which the mixing water and internal heat generated by the cement hydration are retained within the formwork to accelerate the concrete curing process. By capturing and controlling the internal heat of hydration and moisture loss, the Self-Annealing Concrete™ process provides an environment that optimizes the hydration process and interaction with additives improving both short and long-term performance. The Self-Annealing Concrete™ process:

Eliminates thermal shock;
Accelerates strength gain;
Reduces shrinkage and thermal stresses resulting in a more durable concrete; and
Allows high supplementary cementitious material (SCM) replacement of ordinary Portland cement (OPC) in concrete mixes without affecting performance Thus, the following is achieved:
Significant reduced $CO_2$ impact; and
Potentially lower cost.

The replacement of OPC with higher quantities of SCMs than are feasible with conventional formwork results in concrete with lower calcium hydroxide content, lower permeability at the same w/c ratio and a lower carbon footprint. The improved durability and lower carbon footprint meet many of the challenges facing the concrete industry.

Slag cement, also known as ground granulated blast-furnace slag (GGBFS) and fly ash are both pozzolans. Pozzolan is a siliceous or siliceous and aluminous material which, in itself, possesses little or no cementitious value but which will, in finely divided form and in the presence of water, react chemically with calcium hydroxide at ordinary temperature to form compounds possessing cementitious properties. A pozzolan is a siliceous or aluminosiliceous material that, in finely divided form and in the presence of moisture (water), chemically reacts with the calcium hydroxide released by the hydration of portland cement to form calcium silicate hydrate and other cementitious compounds. Such pozzolanic materials include, but are not limited to, volcanic ash, pumice, silica fume; metakaolin; rice hull (or rice husk) ash; ground burnt clay bricks; brick dust; bone ash; calcined shale; calcined clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups. Lassenite is a crystalline, porous aluminosilicate known as a pozzolan having established water retention and cementing properties. A group of pozzolans of particular interest are finely ground igneous rock and feldspars minerals such as, but not limited to, brown nepheline syrenite, blue nepheline syrenite, quartz latite porphyry (Dacite), Andesite, and Rhyolite. These minerals contain silicon dioxide, aluminum oxide, ferric oxide, magnesium oxide, calcium oxide and sulfur trioxide in varying amounts. A group of minerals of special interest are finely ground Hyaloclastite, Sideromelane or Tachylite. Of course, like most pozzolans the foregoing minerals must be ground to a fine powder before they display pozzolanic activity. See ASTM C618-12a for a classification test. Specifically, the foregoing minerals should be ground to a particle size so that at least 66% by weight passes a 325 mesh screen; preferably 70% by weight passes a 325 mesh screen, more preferably 80% by weight passes a 325 mesh screen, most preferably 90% by weight passes a 325 mesh screen, especially 95% by weight passes a 325 mesh screen. The foregoing percentages include all intermediate values.

The portland cement can also be replaced, in whole or in part, by one or more inert or filler materials other than portland cement, slag cement or pozzolanic material. Such other inert or filler materials include, but are not limited to limestone powder; calcium carbonate; titanium dioxide; quartz; or other finely divided minerals that densify the hydrated cement paste. In one disclosed embodiment, the cementitious material for use with the present invention comprises one or more hydraulic cements and one or more pozzolans, preferably one or more pozzolans other than fly ash or slag cement.

The preferred the cementitious material for use in one disclosed embodiment of the present invention comprises 0% to approximately 80% by weight of one or more pozzolans, preferably approximately 10% to approximately 80% by weight one or more pozzolans, preferably approximately 10% to approximately 75% by weight one or more pozzolans, preferably approximately 10% to approximately 70% by weight one or more pozzolans, preferably approximately 10% to approximately 65% by weight one or more pozzolans, preferably approximately 10% to approximately 60% by weight one or more pozzolans, preferably approximately 10% to approximately 55% by weight one or more pozzolans, preferably approximately 10% to approximately 80% by weight one or more pozzolans, preferably approximately 10% to approximately 45% by weight one or more pozzolans, more preferably approximately 10% to approximately 40% by weight one or more pozzolans, most preferably approximately 10% to approximately 35% by weight one or more pozzolans, especially approximately 33⅓% by weight one or more pozzolans. In another disclosed embodiment of the present invention, the preferred cementitious material comprises 0% by weight one or more pozzolans, approximately 5% by weight one or more pozzolans, approximately 10% by weight one or more pozzolans, approximately 15% by weight one or more pozzolans, approximately 20% by weight one or more pozzolans, approximately 25% by weight one or more pozzolans, approximately 30% by weight one or more pozzolans, approximately 35% by weight one or more pozzolans, approximately 40% by weight one or more pozzolans, approximately 45% by weight one or more pozzolans or approximately 80% by weight one or more pozzolans, approximately 55% by weight one or more pozzolans, approximately 60% by weight one or more pozzolans, approximately 65% by weight one or more pozzolans, approximately 70% by weight one or more pozzolans or approximately 75% by weight one or more pozzolans, approximately 80% by weight one or more pozzolans or any sub-combination thereof.

In one disclosed embodiment, the cementitious material for use with the present invention comprises 0% to approximately 100% by weight portland cement, and approximately 5% to approximately 80% by weight one or more pozzolans other than fly ash or slag cement. In one disclosed embodiment, the cementitious material for use with the present invention comprises 0% to approximately 80% by weight portland cement and approximately 5% to approximately 80% by weight one or more pozzolans other than fly ash or slag cement. In another disclosed embodiment, the cementitious material for use with the present invention comprises 0% to approximately 70% by weight portland cement and approximately 5% to approximately 80% by weight one or more pozzolans other than fly ash or slag cement. In another disclosed embodiment, the cementitious material for use with the present invention comprises 0% to approximately 60% by weight portland cement and approximately 5% to approximately 80% by weight one or more pozzolans other than fly ash or slag cement. In another disclosed embodiment, the cementitious material for use with the present invention comprises 0% to approximately 50% by weight portland cement and approximately 5% to approximately 80% by weight one or more pozzolans other than fly ash or slag cement. In another disclosed embodiment, the cementitious material for use with the present invention comprises 0% to approximately 45% by weight portland cement and approximately 5% to approximately 80% by weight one or more pozzolans other than fly ash or slag cement. In another disclosed embodiment, the cementitious material for use with the present invention comprises 0% to approximately 40% by weight portland cement and approximately 5% to approximately 80% by weight one or more pozzolans other than fly ash or slag cement. In another disclosed embodiment, the cementitious material for use with the present invention comprises 0% to approximately 35% by weight portland cement and approximately 5% to approximately 80% by weight one or more pozzolans other than fly ash or slag cement.

The cementitious material for use in one disclosed embodiment of the present invention can also optionally include inert fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 1% to approximately 30% by weight. In one disclosed embodiment, the cementitious material for use with the present invention comprises 0% to approximately 100% by weight portland cement, approximately 10% to approximately 90% by weight slag cement, approximately 5% to approximately 80% by weight one or more pozzolans and 0% to approximately 40% by weight inert filler. In another disclosed embodiment, the cementitious material for use with the present invention comprises approximately 10% to approximately 100% by weight portland cement; approximately 5% to approximately 80% by weight one or more pozzolans; and 1% to approximately 40% by weight inert filler.

The present invention can also be used to accelerate the curing of high performance concrete mixes and ultra high performance concrete mixes.

The concrete form system of the present invention provides a very versatile building system. And, unlike the modular insulated concrete forms of the prior art, the concrete form system of the present invention provides a building system that can perform all of the same tasks as conventional steel and/or wood concrete form systems, including building high-rise buildings.

All percentages set forth herein are percent by weight. All ranges include all intermediate values.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A product comprising:
   a first removable concrete form having a concrete forming face;
   a first insulating panel insert having a first primary surface and an opposite second primary surface, wherein the second primary surface of the first insulating panel insert contacts the concrete forming face of the first removable concrete form;
   a first opposing concrete form opposite the first removable concrete form and first insulating panel insert defining a concrete receiving space therebetween;
   a first temperature sensor disposed in the concrete receiving space; and
   a first data transmitter disposed in a first cavity defined by the second primary surface of the first insulating panel insert, the data transmitter being operatively connected to the first temperature sensor so that the first temperature sensor can provide a signal to the first data transmitter corresponding to the temperature sensed by the first temperature sensor, wherein the first cavity is not in fluid communication with the concrete receiving space.

2. The product of claim 1 further comprising a quantity of plastic concrete disposed in the concrete receiving space and encompassing the first temperature sensor.

3. The product of claim 2 further comprising a receiver remote from the first removable concrete form and first insulating panel insert and operative for receiving signals from the first data transmitter, so that the temperature of concrete in the concrete receiving space can be determined over a period of time.

4. The product of claim 2, wherein the first removable concrete form is removable from the first insulating panel insert when the plastic concrete in the concrete receiving space is at least partially cured.

5. The product of claim 4, wherein the first insulating panel insert is removable from at least partially cured concrete disposed in the concrete receiving space.

6. The product of claim 5, wherein the first opposing concrete form is removable from at least partially cured concrete disposed in the concrete receiving space.

7. The product of claim 1, wherein the first data transmitter is removable from the first cavity.

8. The product of claim 1 further comprising an elongate anchor member having an enlarged portion and an elongate portion, the elongate portion having a first end and an opposite second end, wherein the enlarged portion is disposed on the second end and contacts the second primary surface of the first insulating panel insert, wherein the elongate portion extends through the first insulating panel insert and extends outwardly from the first primary surface of the first insulating panel insert, wherein the enlarged portion is attached to the elongate portion at the second end and extends radially outwardly therefrom, wherein a retaining member having a first end and an opposite end is disposed on the elongate portion such that the first end of the elongate portion is received within the retaining member, wherein a spacer member having a first end and an opposite second end is disposed on the elongate portion of the elongate anchor member between the retaining member and the first insulating panel insert, and wherein the first end of the spacer member contacts the first primary surface of the first insulating panel insert and wherein the second end of the spacer member contacts the first end of the retaining member.

9. A product comprising:

a first removable concrete form having a concrete forming face;

a first insulating panel insert having a first primary surface and an opposite second primary surface, wherein the second primary surface of the first insulating panel insert contacts the concrete forming face of the first removable concrete form;

a first opposing concrete form opposite the first removable concrete form and first insulating panel defining a concrete receiving space therebetween;

a first temperature sensor disposed in the concrete receiving space; and a first data transmitter operatively associated with the first temperature sensor so that the first temperature sensor can provide a signal to the first data transmitter corresponding to the temperature sensed by the first temperature sensor; and a receiver remote from the first removable concrete form and first insulating panel insert and operative for receiving signals from the first data transmitter, so that the temperature of concrete in the concrete receiving space can be determined over a period of time.

* * * * *